United States Patent [19]
Moeller et al.

[11] Patent Number: 5,888,162
[45] Date of Patent: *Mar. 30, 1999

[54] INFINITELY VARIABLE TRANSMISSION WITH POWER SPLITTING

[75] Inventors: Frank Moeller, Milford; William Stanley Turner, Uttoxeter; Raymond John Hicks, Llandrindod Wells, all of United Kingdom

[73] Assignee: J.C. Bamford Excavators Limited, Rocester, United Kingdom

[*] Notice: The portion of the term of this patent subsequent to Dec. 24, 2011, has been disclaimed.

[21] Appl. No.: 411,593

[22] PCT Filed: Oct. 6, 1993

[86] PCT No.: PCT/GB93/02073

§ 371 Date: May 24, 1995

§ 102(e) Date: May 24, 1995

[87] PCT Pub. No.: WO94/08156

PCT Pub. Date: Apr. 14, 1994

[30] Foreign Application Priority Data

Oct. 6, 1992 [GB] United Kingdom ............... 9220969
Oct. 6, 1992 [GB] United Kingdom ............... 9220971

[51] Int. Cl.$^6$ ............................................. F16H 47/04
[52] U.S. Cl. ........................... 475/72; 475/80; 475/81
[58] Field of Search ........................... 475/72, 73, 76, 475/78, 80, 81

[56] References Cited

U.S. PATENT DOCUMENTS

| | | | |
|---|---|---|---|
| 3,783,711 | 1/1974 | Orshansky, Jr. | 475/81 |
| 3,866,490 | 2/1975 | Orshansky, Jr. | 475/80 |
| 4,196,889 | 4/1980 | Dudek | 475/319 X |
| 4,802,385 | 2/1989 | Hiraiwa | 74/758 |
| 4,936,165 | 6/1990 | Doyle et al. | 475/72 |
| 5,080,637 | 1/1992 | Tenberge et al. | 475/72 X |
| 5,147,252 | 9/1992 | Mace et al. | 475/252 X |
| 5,207,736 | 5/1993 | Fredriksen | 475/72 X |
| 5,248,283 | 9/1993 | Eckhardt et al. | 475/72 |
| 5,277,670 | 1/1994 | Tenberge | 475/81 |
| 5,330,395 | 7/1994 | Ra et al. | 475/150 X |
| 5,337,629 | 8/1994 | Kita | 475/72 X |
| 5,421,790 | 6/1995 | Lasoen | 475/80 X |
| 5,466,197 | 11/1995 | Mitsuya et al. | 475/72 |
| 5,510,073 | 4/1996 | Kaegi et al. | 475/332 X |

FOREIGN PATENT DOCUMENTS

| | | |
|---|---|---|
| 0 460 584 | 12/1991 | European Pat. Off. . |
| 509 738 | 11/1920 | France . |
| 938 913 | 10/1948 | France . |
| 1 304 080 | 8/1962 | France . |
| 22 27 718 | 12/1972 | Germany . |
| 24 29 268 | 1/1975 | Germany . |
| 26 25 740 | 12/1977 | Germany . |
| 27 24 965 | 12/1978 | Germany . |
| 41 06 746 | 9/1992 | Germany . |
| 1 364 962 | 8/1974 | United Kingdom . |
| 1 432 883 | 4/1976 | United Kingdom . |
| WO/89/09353 | 10/1989 | WIPO . |

*Primary Examiner*—Dirk Wright
*Assistant Examiner*—Peter T. Kwon
*Attorney, Agent, or Firm*—Marshall, O'Toole, Gerstein, Murray & Borun

[57] ABSTRACT

An infinitely variable drive transmission including an input member, a summing gear set, and a variable speed transmission having an input element drivable by the input member and an output element, the output element of the variable speed transmission being connectable to one element of the summing gear set, to provide a first path between the input member and the summing gear set. The input member being connectable to another element of the summing gear set to provide a second path between the input member and the summing gear set. The summing gear set includes a driven member drivable by at least one further element of the summing gear set and drive transmitting means connectable between the output element of the variable speed transmission and the other element of the summing gear set.

30 Claims, 14 Drawing Sheets

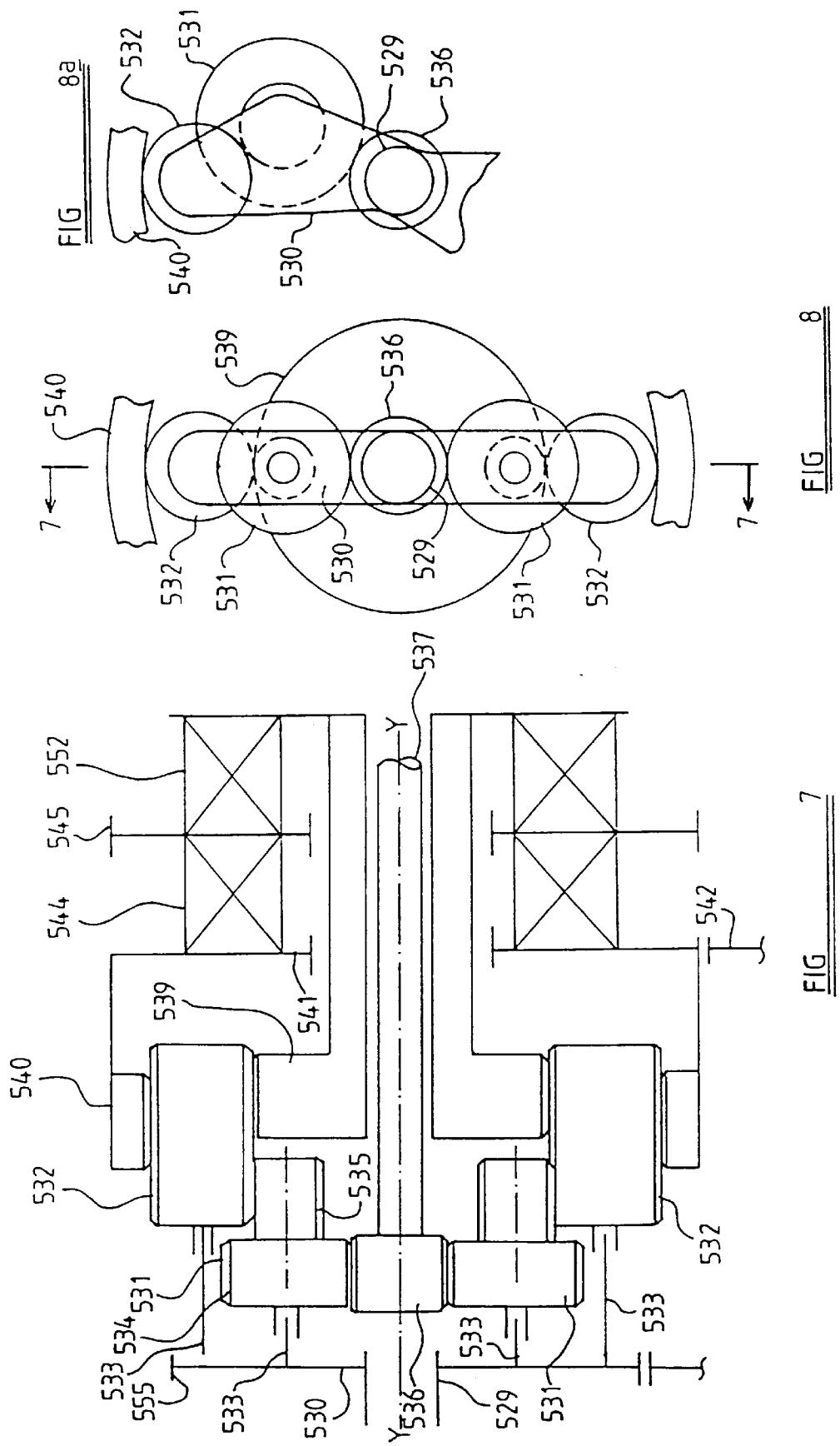

5,888,162

INFINITELY VARIABLE TRANSMISSION WITH POWER SPLITTING

BACKGROUND OF THE INVENTION

This invention relates to a drive transmission.

An object of the invention is to provide a new and improved drive transmission. Another object of the invention is to provide a new and improved differential gear which may be used therein.

In a vehicle such as an agricultural tractor or construction vehicle such as a front end loader vehicle it is desirable to provide a high torque to the driving wheels or tracks of the vehicle when the vehicle is stationery or moving slowly to facilitate, for example, ploughing or loader shovel filling operations. Hitherto such a facility has been provided by disposing a hydrokinetic torque converter in the transmission between a prime mover and the driving wheels or tracks of the vehicle. Use of a hydrokinetic torque converter results in power loss.

A further object of the invention is to provide a new and improved infinitely variable transmission whereby the above mentioned disadvantages are overcome or are reduced.

SUMMARY OF THE INVENTION

According to one aspect of the present invention we provide an infinitely variable drive transmission comprising
an input member,
a summing gear set,
a variable speed transmission having an input element drivable by said input member and an output element;
said output element of the variable speed transmission being connectable to one element of the summing gear set, to provide a first path between the input member and the summing gear set,
said input member being connectable to another element of the summing gear set to provide a second path between the input member and the summing gear set, the summing gear set having a driven member drivable by at least one further element of the summing gear set and drive transmitting means connectable between the output element of the variable speed transmission and said other element of the summing gear set.

The drive transmitting means may cause rotation of the one and other elements in the same direction.

The drive transmitting means may cause rotation of the one and other elements in opposite directions.

The drive transmitting means may be a reversing gear set connectable between the output element of the summing gear set and said one or other element of the summing gear set.

By providing said drive transmitting means the direction of rotation imparted to the other element by the output element of the variable speed transmission, which is in the same sense as the direction of rotation imparted to the other element by the input member, may be in the same or the opposite direction to the direction of rotation of the one element, as desired for any particular transmission.

The transmission preferably comprises a first clutch for connecting said output element of the variable speed transmission to said other element of the summing gear set through said drive transmitting means and a second clutch for connecting said input member to said other element of the summing gear set.

The transmission may include a third clutch for connecting said input member, in the reverse sense to the direction of rotation of the input member provided by the second clutch, to said other element.

When the first clutch is engaged and the second and third clutches are disengaged, is driven solely by the variable speed transmission. When the second clutch is engaged and the first and third clutches are disengaged "compound" forward drive is achieved, with the gear ratio being adjustable dependent upon the speed of rotation of the output element of the variable speed transmission.

When the first and second clutches are disengaged and the third clutch is engaged "compound" reverse direction drive of the driven member is provided with the speed of rotation being dependent upon the speed of rotation of the output element of the variable speed transmission.

The drive transmitting means thus acts as a mode selector permitting selection of solely variable speed transmission, drive in forward or reverse or "compound", e.g. hydromechanical drive in forward or in reverse.

The input member may rotate about a first axis of rotation and the one and other elements of the summing gear set may rotate about a second axis of rotation parallel to and spaced from the first axis of rotation.

The variable speed transmission may be a hydrostatic transmission.

The hydrostatic transmission may comprise a pump hydraulically connected to a motor. At least one of the pump and motor may be of variable displacement, preferably the pump.

Said summing gear set may comprise a controllable four element differential gear set, first and third elements thereof providing said one and other elements of the summing gear set respectively, and second and fourth elements thereof providing said further elements of the summing gear set and being alternatively connectable to the driven member.

The transmission may comprise a first output clutch to connect the second element to the drive member and a second output clutch to connect the fourth element to the drive member.

The transmission may comprise a range change gear set, there being a range change clutch to connect the summing gear set to the drive member through the range change gear set.

The transmission may comprise a range change gear set comprising a lay shaft, a first lay shaft gear fixed to rotate with the lay shaft, a second lay shaft gear connectable to rotate with the lay shaft by a range change clutch. The first lay shaft gear may be drivingly connected to the output member and the second lay shaft gear may be drivingly connected to the fourth element.

The lay shaft gear ratio may equal, or substantially equal, the ratio of the speeds of rotation of the second and fourth elements.

The range change gear set may drive the output member from the fourth element at the same or substantially the same speed as the output member may be driven by the second element at a predetermined speed of rotation between the second and fourth elements. For example, when the second and fourth elements are rotating at their maximum speed differential.

The transmission may comprise a first gear to drive said one element of the summing gear set, a second gear to drive said other element of the summing gear set, a third gear, driven by said output element to drive said second gear, the first gear being driven from the second gear in the opposite or the same direction as the second gear.

The input member may drive the first input idler gear, connectable by a clutch to said other element and the input member may drive a second input idler gear, connectable by a clutch to an intermediate gear to drive said other element in the reverse direction to that in which it is driven by the first input idler.

The second input idler may be co-axial with a shaft to which the second gear is connected and which shaft is connectable by a clutch to said intermediate gear.

The input element of the variable speed transmission may be driven from said second input idler.

The transmission may further comprise an idler gear interposed between the first gear and the second gear to cause them to rotate in the same directions.

The reversing gear set may be of other configuration to that described above, examples of which will now be set out.

The reversing gear set may comprise a "cross axis epicyclic gear set", with equal sized first and second bevel gears which is particularly suitable because the gear ratio of the train is unity.

Alternatively the reversing gear set may comprise a "parallel axis epicyclic gear set".

Further alternatively, the reversing gear set may comprise a "sun wheel compound parallel axis epicyclic gear set" or a "twin annulus compound parallel axis epicyclic gear set".

Where the reversing gear set comprises a "cross axis epicyclic gear set", a "parallel axis epicyclic gear set" or a "twin annulus compound parallel axis epicyclic gear set" the third element of the reversing gear set may be connectable by said second clutch to said output element of the variable speed transmission and may be so connected so as to rotate in the same direction as the third element of the controllable four element differential gear.

The second element of the reversing gear set may be stationary.

The first element of the reversing gear set may be connected to rotate with the second element of the second stage summing gear set.

When the reversing gear set comprising a "sun gear compound parallel axis epicyclic gear set" the third element of the reversing gear set may be connectable by said second clutch to said output element of the variable speed transmission and may be so connected so as to rotate in the same direction as a third element of the controllable four element differential gear.

The second element of the reversing gear set may be connected to rotate with the first element of the second stage summing gear set.

The first element of the reversing gear set may be stationary.

Where the reversing gear set is any one of the above mentioned kind of epicyclic gear set the third element of the reversing gear set may also rotate about said second axis of rotation of the controllable four element differential gear, as may the first and second elements of the reversing gear set.

The controllable four element differential gear may comprise a first stage summing gear set connected to a second stage summing gear set.

The first stage summing gear set may comprise a "parallel axis epicyclic gear set" or a "spur gear epicyclic gear set".

The second stage summing gear set may comprise a "parallel axis epicyclic gear set" or a "cross axis epicyclic gear set" or a "sun wheel compound epicyclic gear set" or a "twin annulus compound parallel axis epicyclic gear set", or a "spur gear epicyclic gear set".

The third element of the second stage summing gear set may be connected to said output member of the variable speed transmission and may be so connected so as to rotate in the same direction as the third element of the first stage summing gear set.

The second element of the second stage summing gear set may be connected to rotate with the first element of the first stage summing gear set.

A fourth clutch may be provided for connecting the second element of the first stage summing gear set to the driven member and a fifth clutch may be provided for connecting the second stage summing gear set to the driven member.

The first element of the second stage summing gear set may be connectable by said fifth clutch to the driven member.

Where the first stage summing gear set comprises a "spur gear epicyclic gear set" the first stage summing gear set may be provided with a third spur gear, acting as a fourth element, in mesh with one gear of each pair of planet gears and thus connected to rotate with the first element of the first stage summing gear set, with the second element of the second stage summing gear set being connected to rotate with the fourth element of the first stage summing gear set.

The second stage summing gear set may be disposed between the controllable four element differential gear and the reversing gear set.

Alternatively, the second stage summing gear set may be disposed on the opposite side of the controllable four element differential gear to the reversing gear set.

Instead of the four element differential gear comprising connected first and second stage summing gear sets it may comprise a gear set according to the second aspect of the invention.

The transmission may be provided in a vehicle with the driven member of the transmission being connectable to provide motive power for the vehicle and/or provide a power input to apparatus of the vehicle.

The vehicle may be a construction machine provided with an earth moving appliance.

By a "parallel axis epicyclic gear set" we mean a gear set comprising an annulus, acting as a first element, a planet carrier, acting as a second element, supporting planet gears which are rotatable about axes parallel to the first element and in mesh with the annulus, and a sun gear, acting as a third element, in mesh with the planet gears.

Alternatively said controllable four element differential gear may comprise a cross axis epicyclic gear set.

By a "cross axis epicyclic gear set" we mean a gear set comprising a first bevel gear, acting as a first element, a planet carrier, acting as a second element, supporting planet gears which are rotatable about axes transverse to the first element and in mesh with the first bevel gear, and a second bevel gear, acting as a third element, in mesh with the planet gears. The axes of rotation of the planet gears may be radial to the first element or inclined to a radius, for example, where the bevel gears are of different size.

Alternatively, said controllable four element differential gear may comprise a "sun wheel compound parallel axis epicyclic gear set".

By a "sun wheel compound parallel axis epicyclic gear set" we mean a gear set comprising an annulus, acting as a first element, a planet carrier, acting as a second element, supporting pairs of intermeshed planet gears which are rotatable about axes parallel to the first element and one planet gear of each pair of planet gears being in mesh with the annulus and a sun gear, acting as a third element, and in mesh with the other planet gear of each pair of planet gears.

Alternatively, said controllable four element differential gear may comprise a "twin annulus compound parallel axis epicyclic gear set".

By a "twin annulus compound parallel axis epicyclic gear set" we mean a gear set comprising a first annulus, acting as a first element, a planet carrier, acting as a second element, supporting pairs of intermeshed planet gears which are rotatable about axes parallel to the first element and one planet gear of each pair of planet gears being in mesh with the first annulus and a second annulus, acting as a third element, and in mesh with the other planet gear of each pair of planet gears.

Alternatively, said controllable four element differential gear may comprise a "spur gear epicyclic gear set".

By a "spur gear epicyclic gear set" we mean a gear set comprising a first spur gear, acting as a first element, a planet carrier, acting as a second element, supporting pairs of planet gears, the gears of each pair being intermeshed and one gear of each pair being in mesh with the first spur gear and a second spur gear, acting as a third element, in mesh with the other gear of each pair of planet gears.

According to a second aspect of the invention we provide a controllable four branch differential gear comprising a carrier, acting as a first element,
a plurality of first planet gears,
a plurality of second planet gears,
the carrier supporting at least the second planet gears,
an annulus acting as a second element,
a first sun gear, acting as a third element, in mesh with the first planet gears,
each second planet gear being in mesh with a first planet gear and with the annulus, and
a second sun gear, acting as a fourth element, in mesh with the second planet gear.

The second and fourth elements may be alternately connectable to a first drive member of the transmission.

The first and third elements may be connectable to second and third drive members of the transmission respectively.

The first drive member may be a driven member and the second and third drive members may be driving members.

Alternatively the first drive member may be a driving member and the second and third members driven members.

The planet carrier may support the second planet gears only, each first planet gear being retained in mesh with two adjacent second planet gears and the first sun gear by virtue of its meshing therewith.

Alternatively the second planet gears and the first planet gears may be supported by the planet carrier.

The first planet gears may be disposed closer to the first sun gear than the second planet gears.

The first and second planet gears may be mounted for rotation about respective axes which lie in a common plane radial to the axis of rotation of the carrier.

Alternatively the first and second planet gears may be mounted for rotation about axes which lie in different planes radial to the axis of rotation of the carrier.

By supporting the first and second planetary gears on the planet carrier a wider range of ratios is made available than where the first planet gears are not supported by the carrier and are retained in mesh only by virtue of engagement with the first sun gear and the second planet gears.

A still greater range of ratios is made available by virtue of the following features.

The first planet gears and/or the second planet gears may have meshing parts of different diameter.

Each first planet gear may have a first meshing part in mesh with the first sun gear and a second meshing part in mesh with a second planet gear, the first and second meshing parts may be of different diameter.

Preferably the first meshing part is of greater diameter than the second meshing part but if desired the first meshing part may be of smaller diameter than the second meshing part.

Alternatively, or in addition, each second planet gear may have a first meshing part in mesh with the first planet gear, a second meshing part in mesh with the annulus and a third meshing part in mesh with the second sun gear and at least one of said meshing parts may be of a different diameter to the other meshing part or parts.

In one preferred embodiment, however, the first and second planet gears are of constant diameter and the second planet gears are of the same diameter as the first sun gear.

The first, second, third and fourth elements of the differential gear may be rotatable about a common axis.

According to a third aspect of the invention we provide an infinitely variable transmission comprising an input member, a first drive path between said input member and a summing gear set, a second drive path between said input member and said summing gear set, the first drive path including a variable speed transmission and the summing gear set having a driven member which is drivable from said input member through either or both of said first and second drive paths.

When the driven member is driven by the input member only through said first drive path the transmission may transmit high torque at low rotation speed of the output element.

BRIEF DESCRIPTION OF THE DRAWINGS

Examples of the invention will now be described with reference to the accompanying drawings wherein:

FIG. 7 is a diagrammatic illustration, in section on the line 7—7 of FIG. 8, of an epicyclic gear set used in the transmission of FIG. 6, FIG. 8 is a fragmentary end view of the gear set shown in FIG. 7, FIG. 8a is a fragmentary end view of a modification of the gear set shown in FIG. 8.

DETAILED DESCRIPTION

Figure 1:
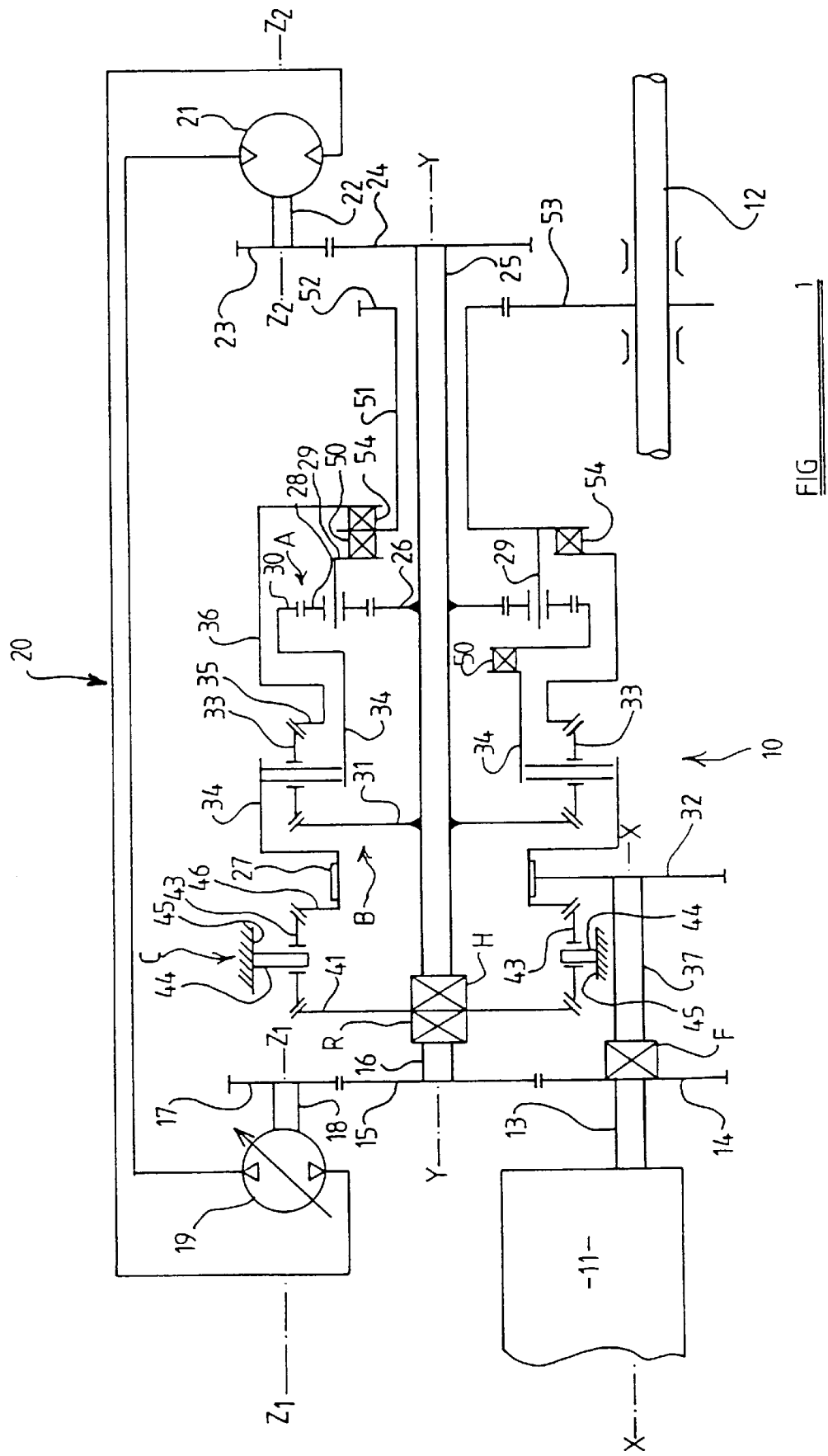
FIG. 1 is a diagrammatic illustration of a drive transmission embodying the invention.

Referring to FIG. 1, an infinitely variable drive transmission 10 is provided to connect a prime mover, such as a diesel engine 11, of a vehicle, such as an agricultural tractor or a construction vehicle, such as a front end loader, to driving wheels thereof driven by a drive element 12.

The transmission 10 has an input member 13 adapted to be driven by the prime mover 11. The input member 13 carries a gear 14 which meshes with an intermediate gear 15 carried on an intermediate shaft 16 and meshing with an input gear 17 carried by an input element 18 of a variable displacement pump 19 of a variable hydrostatic transmission 20. The pump 19 supplies fluid in conventional manner to a motor 21 having an output element 22 carrying an output gear 23 which meshes with a gear 24 carried on a shaft 25. The input member 13 is mounted for rotation about a first axis X—X, the shaft 25 is mounted for rotation about an axis Y—Y which is parallel to and spaced from the shaft X—X, and the input element 18 and output element 22 are mounted for rotation about a third axis Z1—Z1 and a fourth axis Z2—Z2 respectively, the axes Z1 and Z2 being coincident and parallel to and spaced from the axes X—X and Y—Y.

The hydrostatic transmission 20 may be of any suitable variable type and may comprise, for example, a swash plate pump and a swash plate motor, either or both of which may be of adjustable capacity so as to vary the speed and direction of rotation of the output element 22 of the motor relative to that of the input element 18 of the pump. If desired, instead of a hydrostatic transmission any other suitable (continuously) variable speed transmission may be used.

The shaft 25 carries a sun gear 26 of a first stop summing "parallel axis epicyclic gear set" A. The sun gear 26 meshes with planet gears 28 carried by a planet carrier 29 and the planet gears 28 also mesh with an annulus 30. The annulus 30 acts as a first element, the planet carrier 29 acts as a second element and the sun gear acts as a third element of the summing transmission A.

The shaft 25 also carries a first bevel gear 31 of a second stage summing "cross axis (or bevel gear) epicyclic gear set" B. The gear 31 meshes with planetary bevel gears 33 mounted on a planet carrier 34. The bevel gears 33 mesh with a second bevel gear 35 of the epicyclic bevel gear 32 which is connected to a drum 36.

The second bevel gear 35 acts as a first element of the "cross axis epicyclic gear set" 32 whilst the carrier 34 acts as a second element and the first bevel gear 31 as a third element thereof.

The first and second stage summing gear sets A & B together provide a controllable four element differential gear.

The shaft 25 may be connected by a first clutch H to a further bevel gear 41 of a reversing "cross axis epicyclic gear set" C. The bevel gear 41 meshes with planetary bevel gears carried by a planet gear carrier 44 which is anchored to a fixed part 45 of the transmission. The planetary bevel gears 43 mesh with a second further bevel gear 46 which is connected to the gear 27. The second further bevel gear 46 acts as a first element of the reversing gear set C whilst the bevel planet carrier 44 acts as a second element and the first further bevel gear 41 as a third element thereof.

The planet carrier 34 is connected to a gear 27 which meshes with a gear 32 fixed to a shaft 37 which can be connected by a second clutch F to rotate with the input member for forward drive.

The bevel gear 41 may be connected by a third clutch R to the shaft 16 so as to be driven by the input member 13 for reverse.

The planet carrier 29 of the summing gear set A is connectable by a fourth or first output clutch 50, 50' to an output member 51 of the transmission which is connected by a gear 52 and a gear 53 to the driven shaft 12.

Alternatively, when the fourth clutch 50 (shown in the upper part of FIG. 1) is disengaged the drum 36 may be connected by a fifth or second output clutch 54 to the output member 51.

In a modification, shown in the bottom part of FIG. 1, a fourth clutch 50' is provided between the annulus 30 of the summing gear set A and the planet carrier 34 of the epicyclic gear set B whilst the planet carrier 29 of the summing gear set A is connected directly to the output member 51.

In use, assuming that the vehicle is initially stationary so that the driven shaft 12 is stationary, the second and third clutches F, R are disengaged whilst the first clutch H is engaged and the fourth clutch 50, 50' is engaged and the fifth clutch 54 disengaged.

The engine 11 rotates the input member 13 which, via the gears 14, 15, 17, rotates the input element 18 of the hydrostatic transmission 20. At this stage the swash plate angle is zero and therefore the output element 22 of the hydrostatic transmission is stationary. No drive is transmitted to the driven shaft 12.

If it is desired to drive the vehicle forwardly the swash plate angle is increased in the forward drive direction to cause the output element 22 of the motor 21 to rotate in the forward direction thus rotating the shaft 25 through the gears 23 and 24. The shaft 25 causes the gears 26 and 31 to rotate and, because the clutch H is engaged the bevel gear 41 on the reversing gear set C is also caused to rotate, all in the same direction.

Because of the effect of the bevel gears 43 of the reversing gear, the second bevel gear 46 thereof is caused to rotate in the reverse direction to the first bevel gear 41 and thus the gear 27 and the bevel gear carrier 34 of the epicyclic second stage summing cross-axis gear set B are caused to rotate in said reverse direction. Consequently the first element 30 of the summing gear set A is caused to rotate in the opposite direction to the direction of rotation of the third element 26 thereof.

Since the reversing gear set C is an epicyclic cross-axis bevel gear set having a gear ratio of unity the first element 30 and the third element 26 of the summing gear set A rotate at the same speed but in opposite directions. This causes the planet carrier 29 to rotate in the same direction as the first element 30 but at a slower speed dependent upon the relative numbers of teeth on the first and third elements. This forward rotation of the carrier or second element 29 is connected by the fourth clutch 50 to the output member 51 and hence via the gears 52 and 53 to the driven shaft 12. As the swash plate angle increases the speed of rotation increases with a corresponding decrease in torque. The transmission therefore provides a maximum torque when the vehicle is starting to move away from stationary.

At near maximum swash plate angle the output element 22 of the hydrostatic transmission is rotating at the same speed as the input element 18 and thus the first and second bevel gears 41, 46 of the reversing gear set C will be rotated at the same speed as the intermediate gear 15 and since the gears 14 and 32 are of the same diameter the gear 32 will be rotated by the gear 27 at the same speed as the input member 13. The second clutch F is then engaged. Since at this stage the speed of rotation are synchronous the first and second clutches H, F are simultaneously engaged so that drive is constantly transmitted.

Once the second clutch F has been engaged the swash plate angle may be reduced and, shortly after, the first clutch H will automatically disengage. With further reduction in swash plate angle the speed of the output element 22 slows and hence the sun gear 26 of the summing gear set A also slows whilst the first element 30 of the summing gear set A is rotated by the gear 35 via the planet carrier 34 of the epicyclic cross-axis transmission B either directly or in the modification shown in the bottom part of FIG. 1 via the fourth clutch 50'. The slower rate of rotation of the sun gear 26 compared with the rate of rotation of the annulus or first element 30 causes faster rotation of the second element or carrier 29 and thus continued faster rotation of the output member 51.

When the swash plate angle has been reduced to zero the sun gear 26 is stationary whilst the annulus 30 continues to rotate at the same, in the present example, constant speed provided by the prime mover 11 and so the second element or carrier 29 continues to rotate faster.

As the swash plate angle is reversed the sun gear 26 rotates in the reverse direction at an increasing rate whilst the annulus 30 continues to rotate at a constant rate thus further increasing the rate of rotation of the carrier or second element 29 until the carrier 29 reaches the same speed of rotation as the annulus 30. At this stage the fourth clutch 50, 50' is disengaged and the fifth clutch 54 engaged. Again if desired, the fourth and fifth clutches may be simultaneously engaged for a period of time during changeover to avoid any interruption in drive transmission. This is possible because at this stage the drum 36 connected to the second bevel gear 35 of the epicyclic cross-axis gear set B is rotated by the first bevel gear 31 thereof at the same rate as the planet carrier 29 of the summing gear set A is rotated.

On changing the swash plate angle towards zero the speed of rotation of the output element 22 of the hydrostatic transmission is decreased, thus decreasing the speed of the bevel gear 31, whilst the carrier 34 of the epicyclic cross-axis gear set B is caused to rotate at the same speed by the gear 32 and thus the second bevel gear 35 is caused to rotate at a greater speed which is transmitted via the fifth clutch 54 to the output member 51.

As the swash plate angle is increased in the opposite direction the shaft 22 rotates in the opposite direction at an increasing speed, thus rotating the first bevel gear 35 at increasing speed in the opposite direction whilst the carrier 34 is rotated at the same speed thus causing still faster rotation of the second bevel gear 35 and hence of the output member 25.

When it is desired to drive the vehicle in reverse initially the swash plate angle is adjusted in the opposite direction to that described hereinbefore for forward drive so that the output element 22 is rotated in the reverse direction and hence solely hydrostatic drive again takes place similar to that described hereinbefore but in the reverse direction. When the swash plate angle has been increased so that the output element 22 is rotating at the same speed as the input element 18 but in the reverse direction the first clutch H is disengaged and the third clutch R engaged, the second clutch F remaining disengaged. Again the first and third clutches H, R may be simultaneously engaged during changeover.

As the swash plate angle is decreased towards zero the carrier 34 is driven in the reverse direction to that previously described by virtue of it being driven via bevel gear 41, planetary bevel gears 43 and second bevel gear 46 of the reversing gear set C, in the opposite direction to that in which it was driven by the gear 36. Otherwise the transmission operates in an exactly similar manner, but in the reverse direction, to that described hereinbefore for forward drive.

The summing gear sets A and B provide a controllable four element transmission in which first and third elements are provided by sun gears 26, 31 and gear 27 respectively and the second and fourth elements are provided by carrier 29 and drum 36 respectively.

The hereinbefore described transmission therefore provides forward or reverse drive up to the same maximum speed as well as providing a maximum torque at zero vehicle speed as the vehicle starts to move in either forward or reverse.

Figure 2:
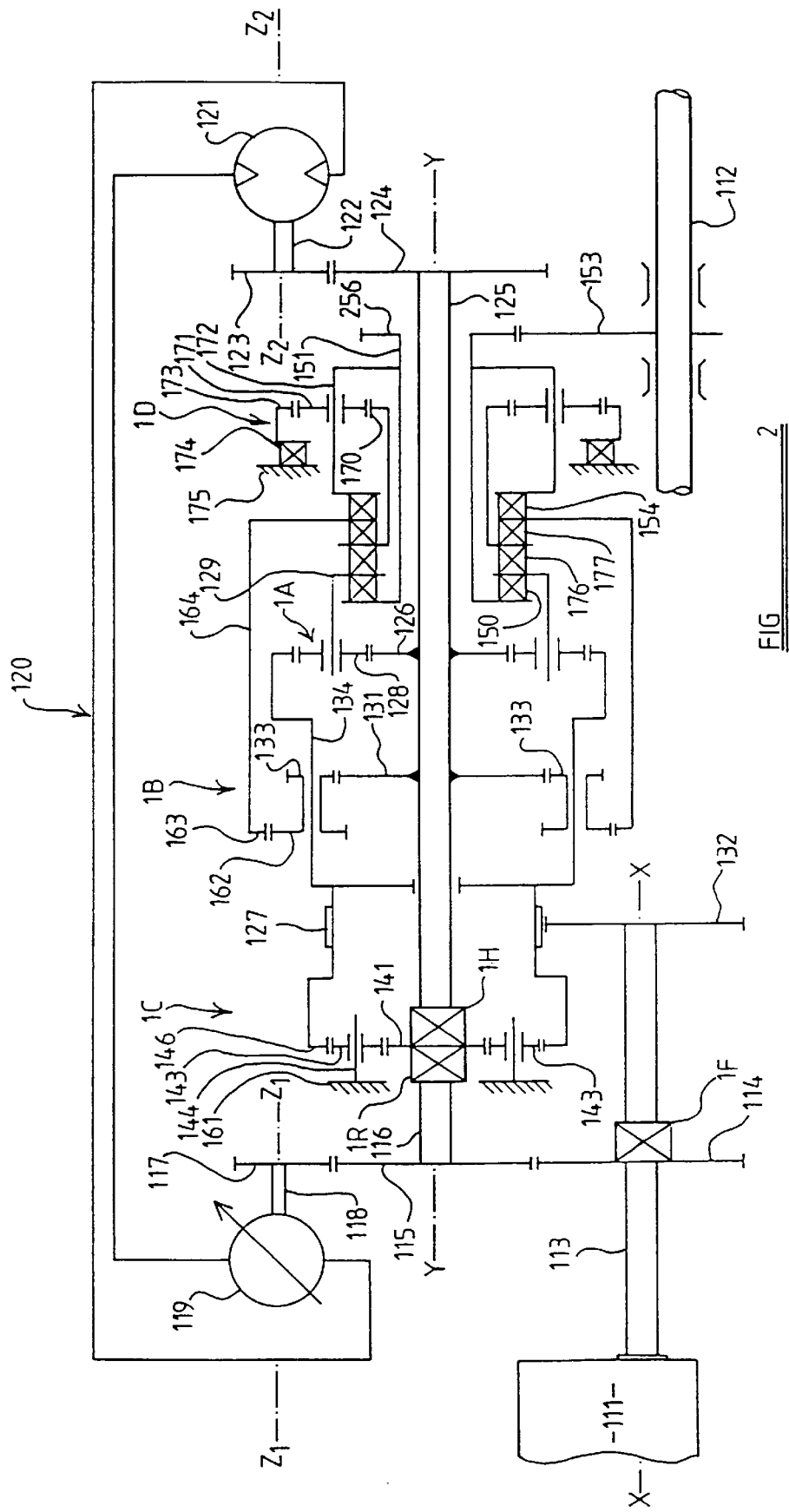
FIG. 2 is a diagrammatic illustration of an alternative embodiment of a drive transmission embodying the invention.

Referring now to FIG. 2, an alternative embodiment is described in which the same reference numerals have been used for corresponding parts but preceded by FIG. 1.

This embodiment differs from the previously described embodiment by virtue of having an epicyclic parallel axis gear set 1B for the second stage summing set and an epicyclic parallel axis gear set 1C for the reversing gear set as well as having a range change set D. Again, the first and second stage gear sets 1A and 1B together provide a controllable four element differential gear.

The reversing set 1C comprises a sun gear 141 which acts as a third element and an annulus 146 which acts as a first element and planetary gears 143 carried on a carrier 144 which acts as a second element and is anchored to a stationary part 161 of the transmission.

In other respects the reversing gear set 1C operates in the same manner as the reversing gear set 1C of the previously described embodiment.

The second stage summing set comprises a sun gear 131 which acts as a third element, epicyclic planet gears 133 carried by a carrier 134 which acts as a second element and the gears 133 are connected to gears 162 which mesh with an annulus 163 which acts as a first element and is connected to a drum 164.

The second stage summing set 1B operates in an analogous manner to the second stage summing train 1B of the previously described embodiment. The first and third elements of the four element differential gear are provided by sun gears 126, 131 and gear 127 respectively and the second and fourth elements are provided by carrier 129 and drum 164 respectively.

The range change set D comprises a sun gear 170 which acts as a third element of the range change epicyclic planetary train which meshes with planet gears 171 mounted on a carrier 172 which acts as a second element. The planet gears 171 mesh with an annulus 173 which acts as a first element and which can be connected by a clutch 174, hereinafter referred to as an eighth or range change clutch, to a stationary part 175 of the transmission.

A sixth clutch 176 is provided to connect the planet carrier 129 of the summing gear set 1A to the sun gear 170 of the range change gear set D whilst a seventh clutch 177 is provided to connect the annulus 163 of the second stage summing set 1B to the carrier or second element 172 of the range change set D.

In use, when the vehicle is stationary and it is desired to drive the vehicle in a forward direction the first clutch 1H is engaged, as is the fourth clutch 150 and the drive is transmitted by the annulus 134 and sun gear 126 rotating at the same speeds in opposite directions as described hereinbefore, thus causing the carrier 129 to rotate and its drive to be transmitted by the fourth clutch 150 to the output member 151.

As in the previously described embodiment, when the swash plate angle reaches its maximum so that the motor 121 is rotated at the same speed as the pump 119 the second clutch 1F can be engaged and the first clutch 1H then disengages so that the gear 127 is rotated via the gear 132 by the engine 111.

Operation of the first stage set 1A is as previously described except that instead of the fourth clutch 150 being engaged the sixth clutch 176 which thus provides a first output clutch is engaged so that the sun gear 170 of the range change set D is driven and, in addition, the eighth or range change clutch 174 is engaged so that the planet carrier 172 is driven to rotate the output shaft 151.

When the swash plate angle has been reduced to zero and reversed and increased to its maximum the sixth clutch 176 is disengaged and the seventh, or second output, clutch 177 engaged so that the rotation of the annulus 163 of the second range set 1B' is transmitted to the sun gear 170 of the range change set D whilst the eighth clutch 174 thereof remains engaged so that drive is transmitted by the carrier 170 to the output shaft 151.

When the swash plate angle has again been moved through zero and to the maximum in the opposite direction the seventh and eighth clutches 177 and 174 are released and the fourth, or third output clutch 150 engaged so that the rotation of the carrier 129 of the summing transmission 127 is connected directly to the output shaft 151.

When the swash plate angle has been moved through zero to the maximum in said opposite direction the fourth clutch 150 is disengaged and the fifth or fourth output clutch 154 engaged so that the annulus 163 of the second range set 1B' is connected to the carrier 172 of the range change set but because the eighth or range change clutch 174 is disengaged the carrier 123 simply rotates at the same speed as the annulus 163 to drive the output shaft 151.

Operation in the reverse direction is exactly analogous except that, as in the first embodiment, except that during hydro-mechanical drive the second clutch 1F is disengaged and the third clutch 1R engaged.

Figure 3:
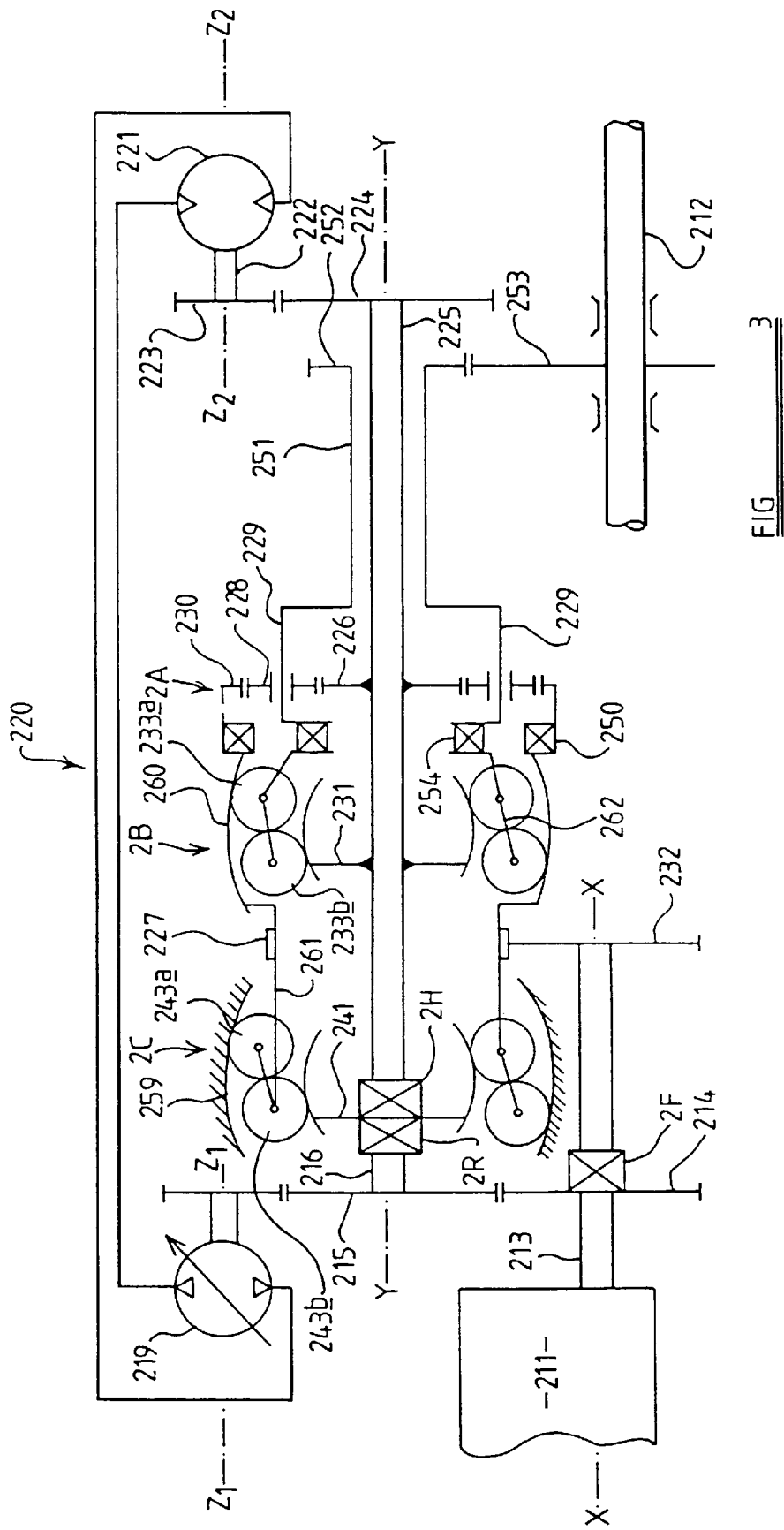
FIG. 3 is a diagrammatic illustration of another drive transmission embodying the invention.

Referring now to FIG. 3 there is illustrated a third embodiment in which the same reference numerals have been used for the corresponding parts as were used in connection with the first embodiment but preceded by a 2.

The embodiment shown in FIG. 3 is similar to that of FIG. 1 except that the reversing gear set 2C and the second stage summing gear set 2B each comprise a "sun gear compound parallel axis epicyclic gear set". Again, the first and second stage gear sets 2A and 2B together provide a controllable four element differential gear.

The reversing gear set 2C comprises an annulus 259, which acts as a first element, and which is maintained stationary and a carrier 261, which acts as a second element, and which carries pairs of intermeshing planet gears 243a, 243b. One planet gear 243a of each pair of planet gears is in mesh with the annulus 259 whilst the other planet gear 243b of each pair of planet gears is in mesh with a sun gear 241, which acts as a third element, and which is connectable by a second clutch 2H to the shaft 225.

The "sun wheel compound parallel axis gear set" of the second stage summing gear set 2B similarly comprises an annulus 260, which acts as a second element, and which is connected to rotate with the carrier 261 of the reversing gear set 2C and is connectable by a fourth clutch 250 to the annulus 236 of the summing gear set 2A. The second stage summing gear set 2B also comprises a planet carrier 262, which acts as a first element, and which carries pairs of intermeshed planet gears 233a, 233b. One gear 233a of each pair of planet gears is in mesh with the annulus 260 whilst the other gear 233b of each pair of planet gears is in mesh with a sun gear 231, which acts as a third element. The carrier 262 is connectable by the fifth clutch 254 to the carrier 229 of the summing gear set 2A.

It is to be noted that with the "sun wheel compound parallel axis epicyclic gear set" type of reversing gear the role of the annulus 259 and the carrier 261 are reversed compared with their roles in the other embodiments described herein and as a result a 1:1 reverse is provided so that the sun gear 241 and the carrier 261 rotate at the same speed but in opposite directions.

In use, when it is desired to drive in a forward direction starting from an at rest condition, the first clutch 2H is engaged and the fourth, or first output, clutch 250 is engaged, whilst the second and third clutches 2F and 2R are disengaged.

Drive is therefore transmitted in an exactly analogous manner to that described with reference to FIG. 1, i.e. by virtue of the sun wheel or third element 226 of the summing gear set 2A being driven by the shaft 225 at the same speed but in the opposite direction to the annulus 230 which is driven via fourth clutch 150 and annulus 260 of the second range gear set 2B which is driven from the carrier 261 of the reversing gear set 2C.

As in the first embodiment when the swash plate angle is increased to maximum the second clutch 2F is engaged and then the first clutch 2H disengages.

Thereafter, the annulus 260 is driven by the gear 227 via the gear 232 and second clutch 2F from the input member 213 at a constant speed whilst the speed of the sun wheel 226 of the summing gear set 2A is first decreased to zero and then increased in the reverse direction thereby driving the carrier 229 of the summing gear set 2A at an increasing speed as described in connection with the first embodiment.

After the swash plate angle has increased to maximum in the reverse direction the fifth or second output clutch 254 is engaged and the fourth or first output clutch 250 disengages. In this condition the drive is transmitted to the output 251 by a fifth clutch 254 from the carrier 262 of the second stage summing set 2B which is rotated as a result of the annulus 260 continuing to be rotated at the same speed by the gear 227 from the input 213 whilst the sun wheel 231 is first decreased in speed and then increased in speed in the opposite direction as the swash plate angle is progressively reversed.

When it is desired to drive the vehicle in a reverse direction then initially drive is purely hydrostatic as a result of rotating the output element 222 of the hydrostatic transmission 220 in the reverse direction to that required for forward drive.

When the swash plate angle is increased to maximum the third clutch 2R is engaged and the first clutch 2H disengages, whilst the fourth clutch 250 remains engaged.

When the clutch 2R is engaged the inner member 241 of the reversing gear set 2C is rotated in the reverse direction and since the annulus 259 is fixed the carrier 261 is rotated in the reverse direction to that achieved in forward drive. Otherwise the drive path is as described at this stage in connection with the first embodiment.

The other stages are as described for the forward direction except that the annulus 260 is driven in the reverse direction via the reversing gear set 2C as described hereinbefore.

The first and third elements of the four element differential gear are provided by sun gears 226, 231 and gear 227 respectively and the second and fourth elements by annulus 260 and carrier 262 respectively.

Figure 4:
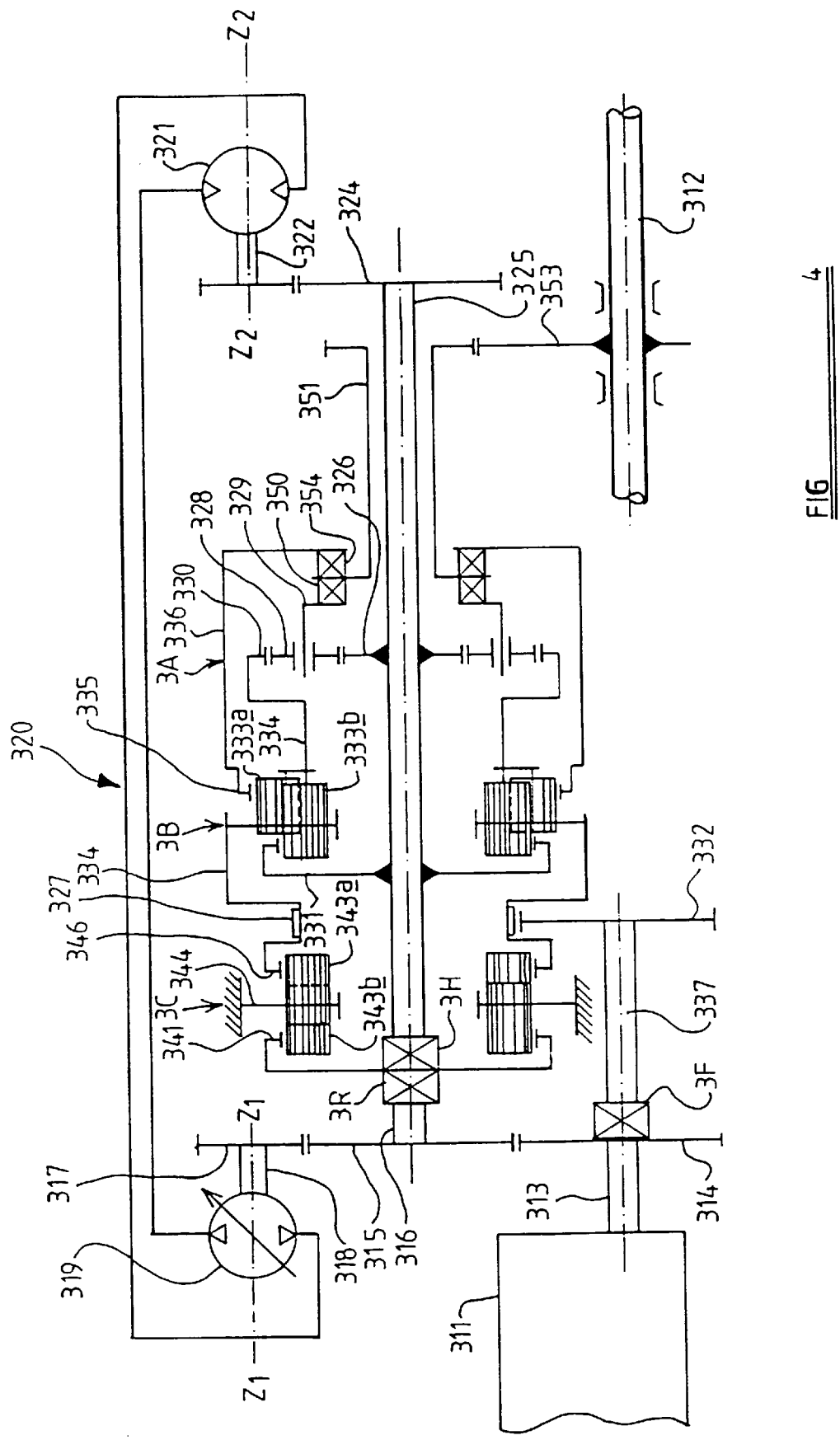
FIG. 4 is a diagrammatic illustration of another drive transmission embodying the invention.

Referring now to FIG. 4 there is illustrated a fourth embodiment in which the same reference numerals have been used for the corresponding parts as were used in connection with the first embodiment but preceded by a 3.

The embodiment shown in FIG. 4 is similar to that of FIG. 1 except that the reversing gear set 3C and the second stage summing gear set 3B each comprise a "twin annulus compound parallel axis epicyclic gear set". Again, the first and second stage gear sets 3A and 3B together provide a controllable four element differential gear.

The reversing gear set 3C comprises a first annulus 346, which acts as a first element, and a planet carrier 344, which acts as a second element, and which is maintained stationary. The carrier 344 carries pairs of intermeshed planetary gears 343a, 343b. One gear 343a of each pair of planetary gears meshes with the annulus 346 whilst the other gear 343b of each pair of planetary gears meshes with a second annulus 341, which acts as a third element.

The planetary gears 343a and 343b are axially offset to enable such mutual intermeshing and engagement with the annuli 346 and 341.

The second stage summing gear set 3B is of similar construction comprising a first annulus 335, which acts as a first element, and a planet carrier 334, which acts as a second element, and which carries pairs of intermeshed planetary gears 333a, 333b. One gear 333a of each pair of planetary gears meshes with the first annulus 335 whilst the other gear 333b of each pair of planetary gears meshes with a second annulus 331, which acts as a third element.

The second annulus 341 of the reversing gear set 3C is connectable to the shaft 325 by clutch 3H or to the gear 315 by the clutch 3R analogous to the first embodiment, whilst the second annulus 346 of the reversing gear set is connected to gear 327 and carrier 334 of the second stage summing gear set 3B and the second annulus 331 of the gear set 3B is connected to the shaft 325.

In use, when it is desired to drive in a forward direction starting from an at rest condition, the first clutch 3H is engaged and the fourth or first output clutch 350 is engaged, whilst the second and third clutches 3F and 3R are disengaged.

Drive is therefore transmitted in an exactly analogous manner to that described with reference to FIG. 1, i.e. by virtue of the sun wheel or third element 326 of the summing gear set 3A being driven by the shaft 325 at the same speed but in the opposite direction to the annulus 330 which is driven via the carrier 334 of the second stage summing gear set 3B which is driven from the first annulus 346 of the reversing gear set 3C which is caused to rotate at the same speed but in the opposite direction to the second annulus or third element 341 of the gear set 3C by virtue of the intermeshing planetary gears 343a, 343b and the fixed carrier 344 thereof.

As in the first embodiment, when the swash plate angle is increased to maximum the first clutch 338 is engaged and then the first clutch 3H disengages.

Thereafter, the carrier 334 is driven by the gear 327 via the gear 332 and the second clutch 3F from the input member 313 at a constant speed, whilst the speed of the sun wheel 326 of the summing gear set 3A is first decreased to zero and then increased in the reverse direction, thereby driving the carrier 329 of the summing gear set 3A at an increasing speed, as described in connection with the first embodiment.

After the swash plate angle has increased to maximum in the reverse direction, the fifth or second output clutch 354 is engaged and the fourth clutch 350 disengages. In this condition the drive is transmitted to the output 351 by a fifth clutch 354 from the first annulus 335 of the second stage summing gear set 3B which is rotated as a result of the carrier 334 continuing to be rotated at the same speed by the gear 327 from the input 313, whilst the second annulus or third shaft 331 is first decreased in speed and then increased in speed in the opposite direction so that the swash plate angle is progressively reversed.

When it is desired to drive the vehicle in a reverse direction the initial drive is purely hydrostatic as a result of rotating the output element 322 of the hydrostatic transmission 320 in the reverse direction to that of the forward drive.

When the swash plate angle is increased to maximum, the third clutch 3R is engaged and the first clutch 3H disengages, whilst the fourth clutch 350 remains engaged.

When the clutch 3R is engaged, the second annulus or third element 341 of the reversing gear set 3C is rotated in the reverse direction and since the planet carrier 344 is fixed, the first annulus or first element 346 is rotated in the reverse direction to that achieved in forward drive. Otherwise the drive path is as described at this stage in connection with the first embodiment.

The other stages are as described for the forward direction except that the planet carrier 334 is driven in the reverse direction by the reversing gear set 3C as described hereinbefore.

The first and third elements of the controllable four element differential gear set are provided by sun gear 326, annulus 331, and carrier 334 respectively, and the second and fourth elements by the carrier 329 and drum 336.

Figure 5:
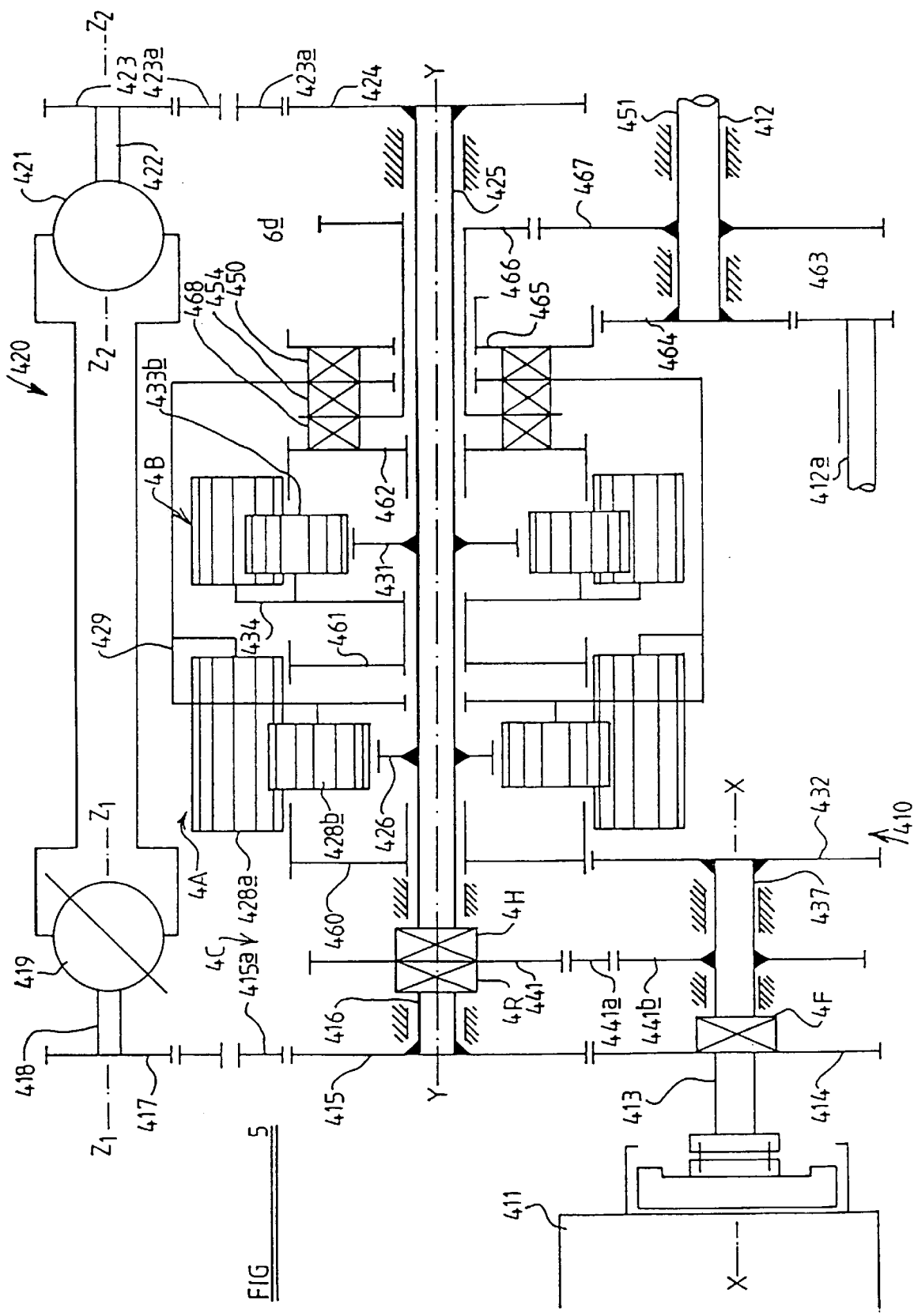
FIG. 5 is a diagrammatic illustration of another drive transmission embodying the invention.

Referring now to FIG. 5, there is illustrated a fifth embodiment in which the same reference numerals have been used for the corresponding parts as were used in connection with the first embodiment but preceded by a 4.

The embodiment shown in FIG. 5 differs from that of the preceding embodiments in that it utilises solely spur gears and thus is economical to manufacture.

The transmission 410 has an input member 413 adapted to be driven by a prime mover 411. The input member 413 carries a gear 414 which meshes with an intermediate gear 415 carried on an intermediate element 416 and meshed with an idler gear 415a which may provide an implement and pump drive which meshes with an input gear 417 carried by an input element 418 of a variable displacement pump 419 of a variable hydrostatic transmission 420. The pump 419 supplies fluid in conventional manner to a motor 421 having an output element 422 carrying an output gear 423 which meshes with an idler gear 423a and with a gear 424 carried on a shaft 425. The input member 413, the shaft 425 and the input element 418 and output element 422 are mounted for rotation about axes X—X, Y—Y, Z1—Z1 and Z2—Z2 respectively as in the first described embodiment.

The shaft 425 carries a sun gear 426 of a summing "spur gear epicyclic gear set" 4A. This gear set has pairs of intermeshed planet gears 428a, 428b carried by a planet carrier 429. One planet gear 428a of each pair meshes with a first spur gear 460 mounted for rotation about the axis Y—Y. The first spur gear 460 acts as a first element, planet carrier 429 acts as a second element and sun gear 426 which meshes with the other planet gear 428b of each pair of planet gears comprises a second spur gear and acts as a third element of the summing transmission 4A. A third spur gear 461, also mounted for rotation about the axis Y—Y, meshes with the one planet gear 428a of each pair of planet gears and acts as a fourth element of the summing transmission 4A.

The shaft 425 also carries a sun gear 431 of a second stage summing "spur gear epicyclic gear set" 4B. This second stage summing gear set comprises pairs of intermeshed planet gears 433a, 433b carried by a planet carrier 434 which is connected to rotate with the fourth element 461 of the summing gear set 4A. A spur gear 462, mounted to rotate about the axis Y—Y meshes with the one planet gear 433a of each pair of planet gears and provides a first spur gear of the second stage summing gear set 4B and acts as a first element thereof. The carrier 434 acts as a second element whilst the sun gear 431 provides a second spur gear of the gear set 4B and acts as a third element of the set 4B. Again, the first and second stage summing gear sets 4B, together provide a controllable four element differential gear.

In this embodiment a reversing gear set 4C is provided which comprises a "spur gear lay shaft reversing gear set". The first spur gear 460 of the summing gear set 4A meshes with a gear 432 fixed to a shaft 437 which can be connected by a second clutch 4F to rotate with the input member 413.

The shaft 425 may be connected by a first clutch 4H to a spur gear 441 of the "spur gear lay shaft reversing gear set 4C". The spur gear 441 meshes with an idler gear 441a rotatable about an axis parallel to the axis Y—Y and which meshes with a further spur gear 441b fixed to rotate with the shaft 437. The gear 441 may be connected by a third clutch 4R to the shaft 416.

The planet carrier 429 of the summing gear set 4A is connectable by a fourth clutch 450 to a gear 465 which meshes with a gear 464 fixed to an output member 451 of the transmission, which itself provides a rear driven shaft 412, and is connected via a gear 463 to a front driven shaft 412a.

Alternatively, the planet carrier 429 of the summing gear set 4A may be connected by a fifth clutch 454 to a gear 466 which meshes with a further gear 467 fixed to the member 451.

Further alternatively, the first element 462 of the second stage summing gear set 4B may be connected by a sixth clutch 468 to the gear 461.

In use, when the vehicle is stationary and it is desired to drive the vehicle in a forward direction the first clutch 4H is engaged, as is the fifth or first output clutch 454 and the drive is transmitted by the first element 460 and the third element 426 rotating at the same speeds in opposite directions thus causing the carrier 429 to rotate and its drive to be transmitted by the fifth clutch 454 to the output member 451 via gears 466, 467.

As in the previously described embodiments, when the swash plate angle reaches its maximum, so that the motor 421 is rotated at the same speed as the pump 419, the second clutch 4F can be engaged and the first clutch 4H then disengages so that the gear 460 is rotated via the gear 432 by the engine 411.

Once the second clutch 4F has been engaged and the first clutch 4H disengaged further reduction in swash plate angle causes the speed of the output element 422 of the hydrostatic pump 421 to slow and hence the sun gear 426 of the summing gear set 4A also slows, whilst the first element 460 of the summing gear set 4A is rotated by the gear 432 at the same speed by the engine 411. The slower rate of rotation of the sun gear 426 compared with the rate of rotation of the first element 460 causes faster rotation of the second element or carrier 429 and thus continued faster rotation of the output member 451.

As the swash plate angle is reversed the sun gear 426 rotates in the reverse direction at an increasing rate whilst the first element 460 continues to rotate at a constant rate, thus further increasing the rate of rotation of the second element 429 and hence of the output shaft 451 until the carrier 429 attains the same speed of rotation as the first element 460. At this stage the sixth or second output clutch 468 is engaged and the fifth clutch 454 automatically disengages whilst the drive is taken up by the sixth clutch 468. On changing the swash plate angle towards zero the speed of rotation of the output element 422 of the hydrostatic transmission is again decreased thus decreasing the speed of the sun gear 431 whilst the carrier 434 of the second stage gear set 4B continues to rotate at the same speed as the motor 411 by virtue of its connection to the fourth element 461 and its connection through the planetary gear 428a with the gear 460 which is in mesh with the gear 432. Thus the first element 462 is caused to rotate at a greater speed which is transmitted via the sixth clutch 468 to the output member 451 via the gears 466, 467.

As the swash plate angle is increased in the opposite direction the element 422 rotates in the opposite direction at an increasing speed, thus rotating the sun gear 431 of the second stage transmission 4B at an increasing speed in the opposite direction, whilst the carrier 434 is continued to be rotated at the same speed by the engine 411, thus causing still faster rotation of the first element 462 and hence of the output member 451.

When the swash plate angle is at its fullest extent the fourth or third output clutch 450 is engaged and the sixth clutch 468 automatically disengages so that drive is again transmitted from the carrier 429 of the first stage gear set 4A but in this case is transmitted to the output member 451 via gear 465 and gear 464.

Reverse operation is analogous to that described in connection with the previous embodiment.

The first and third elements of the four element differential gear set are provided by sun gears 426, 431 and sun gear 460 respectively and the second and fourth elements are provided by carrier 429 and sun gear 462 respectively.

Figure 6:
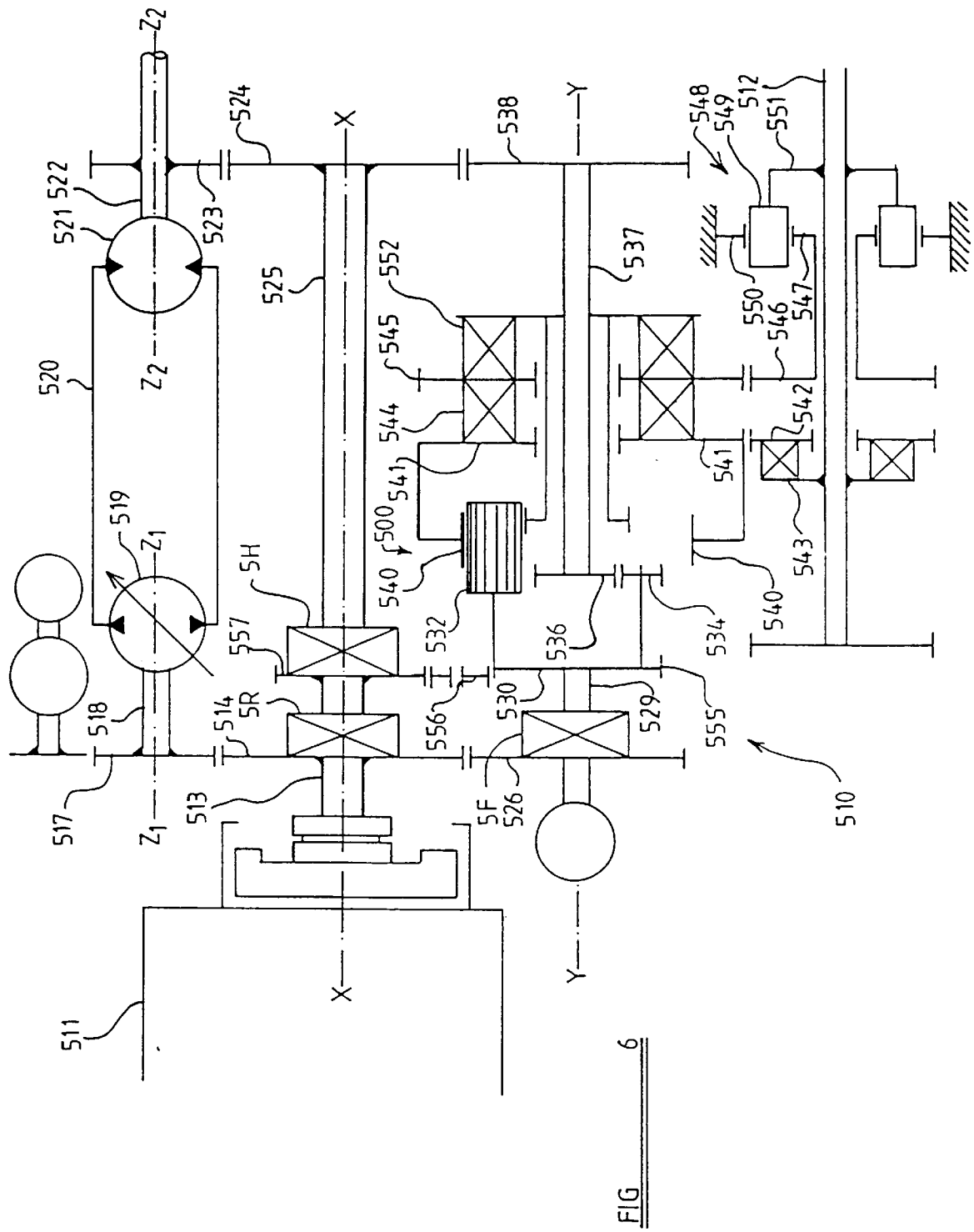
FIG. 6 is a diagrammatic illustration of another drive transmission embodying the invention.

Another embodiment is shown in FIG. 6 which shows a controllable four element differential gear 500 embodied in a drive transmission 510 which, in the illustrated example, connects a prime mover, such as a diesel engine 511 of a vehicle, such as an agricultural tractor or a construction vehicle, such as front-end loader, to driving wheels thereof driven by a first drive member 512. The drive member 512 may provide power to an apparatus of the vehicle such as a hydraulic pump.

If desired the drive transmission may be used for any other desired purpose and the controllable four element differential gear 500 may be used in any other desired application.

The transmission 510 has an input member 513 adapted to be driven by the prime mover 511. The input member 513 carries a gear 514 which meshes with an input gear 517 carried by an input element 518 of a variable displacement pump 519 of a variable hydrostatic transmission 520. The pump 519 supplies fluid in conventional manner to a motor 521 having an output element 522 carrying an output gear 523 which meshes with the gear 524 carried on a shaft 525. The input member 513 and the shaft 525 are mounted for rotation about a first axis X—X, the input element 518 and the output element 522 are mounted for rotation about a third axis Z1—Z1 and a fourth axis Z2—Z2 respectively, the axes Z1—Z1 and Z2—Z2 being coincident and parallel to and spaced from the axis X—X.

The hydrostatic transmission 520 may be of any suitable type and may comprise, for example, a swash plate pump and a swash plate motor, either or both of which may be of adjustable capacity so as to vary the speed of direction of rotation of the output element 522 of the motor relative to that of the input element 518 of the pump. If desired any other suitable kind of (continuously) variable transmission may be provided.

The gear 514 carried by the input member 513 meshes with a further gear 526 which is connectable by a second clutch 5F to a second drive member 529. The second drive member 529 in the present example comprises a driving member, whilst the first drive member 512 comprises a driven member.

Referring now to FIGS. 7–8a.

The drive shaft 529 is connected to a planet carrier 530 of the gear 500. The carrier carries, in the present example, two first planet gears 531 and two second planet gears 532. These gears are mounted, in conventional manner, on shafts 533 fixed to the carrier 530. The first planet gears 531 have a first meshing part 534 and a second meshing part 535 of smaller diameter than the first meshing part 534. The planet gears 532 are of constant diameter.

The first meshing part 534 of the first planet gears 531 mesh with a first, spur, sun gear 536 fixed to a shaft 537 which comprises a third driven member. The shaft 529, planet carrier 530 and shaft 537 rotate about an axis Y—Y which is parallel to and spaced from the axis X—X described hereinbefore. The shaft 537 extends through the controllable four element differential gear 500 and carries, at the end thereof opposite that carrying the sun gear 536, a spur gear 538 which meshes with the gear 524 fixed to the shaft 525.

The second meshing parts 535 of the first planet gears 531 mesh with a portion of the second planet gears 532. A longitudinally adjacent portion of the surface of the second planet gears 532 meshes with a second, spur, sun gear 539), also mounted for rotation about the axis Y—Y.

The second planet gears 532 are also in mesh with an annulus 540 mounted to rotate about the axis Y—Y.

The carrier 530 acts as a first element of the controllable four element differential gear 500 whilst the annulus 540 acts as a second element, the first sun gear 536 acts as a third element and the second sun gear 539 acts as a fourth element.

The second element 540 and the fourth element 539 of the controllable four element differential gear 500 are alternately connectable to the first drive member 512 by clutches, hereinafter to be described.

The annulus 540 is connected to a gear 541 which meshes with the gear 542 connectable by a clutch, hereinafter referred to as a fourth clutch 543, to the first drive member 512. The gear 541 is alternately connectable by a fifth clutch 544 to a further gear 545 which meshes with a gear 546 rotatable about the same axis as the first drive member 512 and which is connected to a sun gear 547 of a further epicyclic gear train 548 which provides a range change gear set having a plurality of planet gears 549 which mesh with the sun gear 547 and with a fixed annulus 550. The planet gears 549 are carried by a planet carrier 551 which is connected to the member 512 so that rotation of the gear 546 by the gear 544 is transmitted to the member 512 through the epicyclic gear set 548 as a result of rotation of the planet carrier 551.

The fourth element of the controllable four element differential gear 500 provided by the second sun gear 539, is connectable by a sixth clutch 552 to the gear 545.

The planet carrier 530 of the controllable four element differential gear 500 is provided with a gear 555 which meshes with an idler gear 556 which meshes with a gear 557 which is connectable by a clutch, hereinafter referred to as a second clutch 558, to the element 525. The shaft 525 is also connectable by a clutch, hereinafter referred to as a third clutch 559, to the gear 514 and hence to the input member 513.

FIG. 8a shows an alternative configuration of the planet gears where, unlike FIG. 8, the planet gears are not rotatable about axes lying in a common plane radial to the axis of rotation of the carrier.

In use, assuming that the vehicle is initially stationary so that the driving shaft 512 is stationary, the second and third clutches 5F and 5R are disengaged whilst the first clutch 5H is engaged, the fifth or first output clutch 544 is engaged and the fourth and sixth clutches 554 and 552 are disengaged. The engine 511 rotates the input member 513 which via the gears 514 and 517 rotates the input element 518 of the hydrostatic transmission 520. At this stage the swash plate angle is zero and therefore the output element 522 of the hydrostatic transmission is stationary. No drive is transmitted to the driven shaft 512.

If it is desired to drive the vehicle forwardly the swash plate angle is increased in a forward drive direction to cause the output element 522 of the motor 521 to rotate in the forward direction, thus rotating the shaft 525 through the gears 523 and 524. The shaft 525 causes the gear 557 to rotate and thus to rotate the gear 555 in the reverse direction because of the interposition of the idler gear 556. In consequence, the planet carrier 530 is rotated in the same direction as the shaft 525. At the same time, the gear 524 drives the gear 538 an thus the shaft 537 and hence the first sun gear 536 is rotated in the opposite direction to the planet carrier 530. Consequently annulus 540, which constitutes the second element of the gear 500, is caused to rotate in the opposite direction to the direction of rotation of the third element 536 thereof. This forward motion of the second element 540 is transmitted by the fifth clutch 544 to the gear 545 which drives the first drive member 512 through the epicyclic gear train 548 to provide a solely hydrostatic drive. As the swash plate angle increases the speed of rotation increases, with the corresponding decrease in torque. The transmission provides a maximum torque when the vehicle is starting to move away from stationary.

At near maximum swash plate angle the output element 522 of the hydrostatic transmission is rotating at the same speed as the input element 518 thereof and thus at the same speed as planet carrier 530. Hence, at this stage the speed of rotation of the gear 526 is synchronous with the speed of rotation of shaft 529 driven from the gear 557 and so the second clutch 5F may be engaged and, indeed, the first and second clutches 5H, 5F may be simultaneously engaged so that drive is constantly transmitted.

Once the second clutch 5F has been engaged the swash plate angle may be reduced and, shortly after, the first clutch 5H will automatically be disengaged. With further reduction in swash plate angle the speed of the output element 522 of the hydrostatic transmission slows and hence the speed of rotation of the first sun gear 536 of the controllable four element differential gear 500 also slows, whilst the second element of the gear 500 provided by the carrier 530 is continued to be rotated at engine speed. The slower rate of rotation of the sun gear 536 compared with the rate of rotation of the second element 530 causes faster rotation of the second element 540 and thus continued faster rotation of the output member 512.

When the swash plate angle has been reduced to zero the sun gear 536 is stationary whilst the carrier 530 continues to rotate at the same speed provided by the prime mover 511 so the second element 540 continues to rotate faster.

As the swash plate angle is reversed the sun gear 526 rotates in the reverse direction at an increasing rate whilst the carrier 530 continues to rotate at a constant rate, thus further increasing the rate of rotation of the second element 540. At this stage the fifth or first output clutch 544 is disengaged and the sixth or second output clutch 552 is engaged so that drive is now transmitted through the fourth element, i.e. the second sun gear 539, and the sixth clutch 552 to the gear 545 and then via the epicyclic transmission 548 to the drive shaft 512.

Again, if desired, the fifth and sixth clutches may be simultaneously engaged for a period of time during changeover to avoid any interruption of the drive transmission because of the synchronicity of speeds of the annulus 540 and the second sun gear 539.

On changing the swash plate angle towards zero the speed of rotation of the output member 532 of the hydrostatic transmission is decreased, thus decreasing the speed of the sun gear 536, whilst the carrier 530 continues to rotate at constant speed and thus the sun gear 539 is caused to rotate at a greater speed which is transmitted via the sixth clutch 552 to the drive member 512.

As the swash plate angle is increased in the opposite direction the output element 522 rotates in the opposite direction at an increasing speed, thus rotating the sun gear 536 at increasing speed in the opposite direction, whilst the carrier 530 is rotated at the same speed, thus causing still faster rotation of the second sun gear 539 and hence of the member 512.

When the swash plate angle has been increased in said opposite direction to its maximum value, the fourth, or third output, clutch 543 is engaged and the sixth clutch 552 disengaged so that the annulus 540 again transmits drive but in this case through the gear 541 to the gear 542 which is connected by the fourth clutch 543 to the drive member 512 so that on reversal of the direction of movement of the swash plate, the drive shaft 512 is driven at increasing speed.

When it is desired to drive the vehicle in a reverse direction, initially, the swash plate angle is adjusted in the opposite direction to that described hereinbefore for forward drive so that the output element 522 is rotated in the reverse direction and hence solely hydrostatic drive again takes place similar to that described hereinbefore but in the reverse direction. When the swash plate angle has been increased so that the output element 522 is rotating at the same speed as the input element 518 but in the reverse direction, the first clutch 5H is disengaged and the third clutch 5R is engaged, the second clutch 5F remaining disengaged. Again, the first and third clutches 5H and 5R may be simultaneously engaged during changeover.

In so far as the fifth, or first output, clutch 544 and the sixth, or second output, clutch 552 direct drive through the range change gear set 548 they comprise range change clutches.

As the swash plate angle is decreased towards zero, the annulus 540 is driven the the reverse direction to that previously described, by virtue of its being driven via the carrier 530 and the first sun gear 536 but in the opposite direction to that in which it was driven to the idler gear 556. Otherwise, the transmission operates in an exactly similar manner, but in the reverse direction, to that described hereinbefore for forward drive. The hereinbefore described transmission therefore provides forward or reverse drive up to the same maximum speed through a hydrostatic range and three compound ranges thus providing a maximum torque at zero vehicle speed as the vehicle starts to move in either forward or reverse.

The hereinbefore described gear set illustrated in FIGS. 7–8*a* provides a wide range of ratios.

If, however, a smaller range of ratios is acceptable, an alternative epicyclic gear set may be provided instead of the controllable four element differential gear 500 shown in FIGS. 7–8*a*.

Figure 10A:
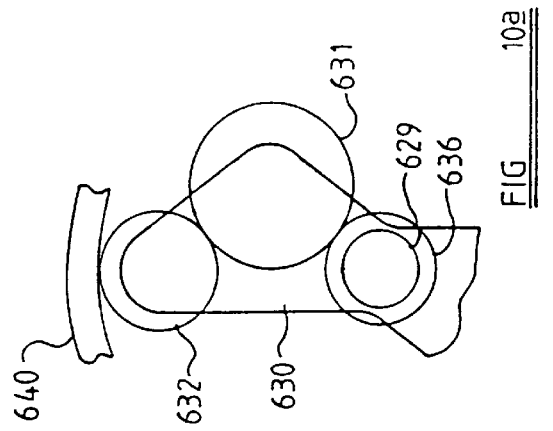
FIG. 10a is a fragmentary end view of a modification of the gear set shown in FIG. 9.
Figure 10:
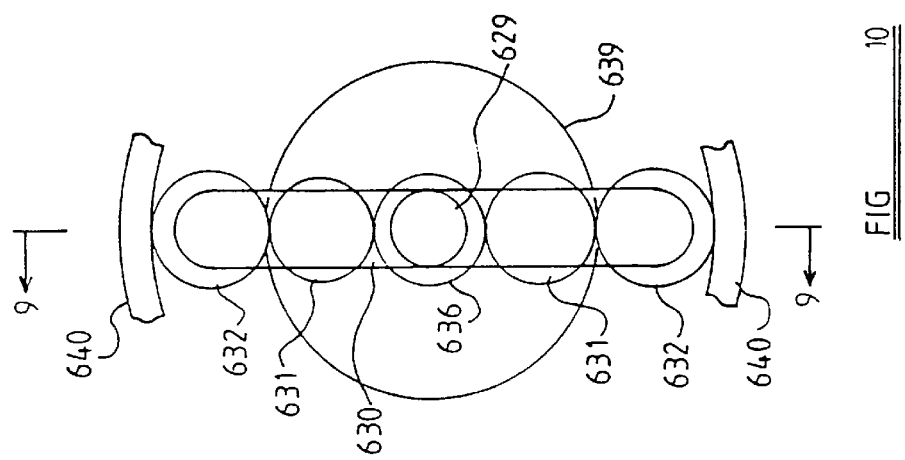
FIG. 10 is a fragmentary end view of the gear set shown in FIG. 9.
Figure 9:
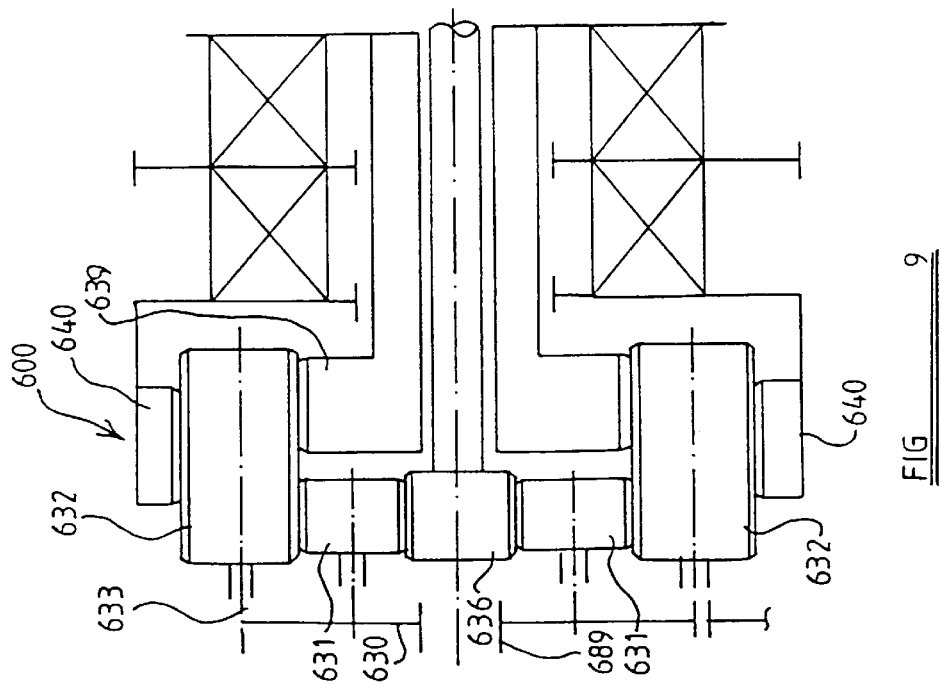
FIG. 9 is a diagrammatic illustration similar to that of FIG. 7 but of an alternative embodiment of the gear set and on the line 9—9 of FIG. 10.

Referring now to FIGS. 9–10*a*, such an alternative form of controllable four element differential gear is illustrated at 600. In FIGS. 9–10 the same reference numerals have been used to refer to corresponding parts as were used in FIGS. 4–8*a* but with the substitution of an initial FIG. 6 for FIG. 5.

The controllable four element differential gear 600 differs from the gear 500 solely by virtue of the first planet gears 631 being of constant diameter instead of the stepped configuration of the gear 500. The absence of stepping limits the ratios available.

Figure 12:
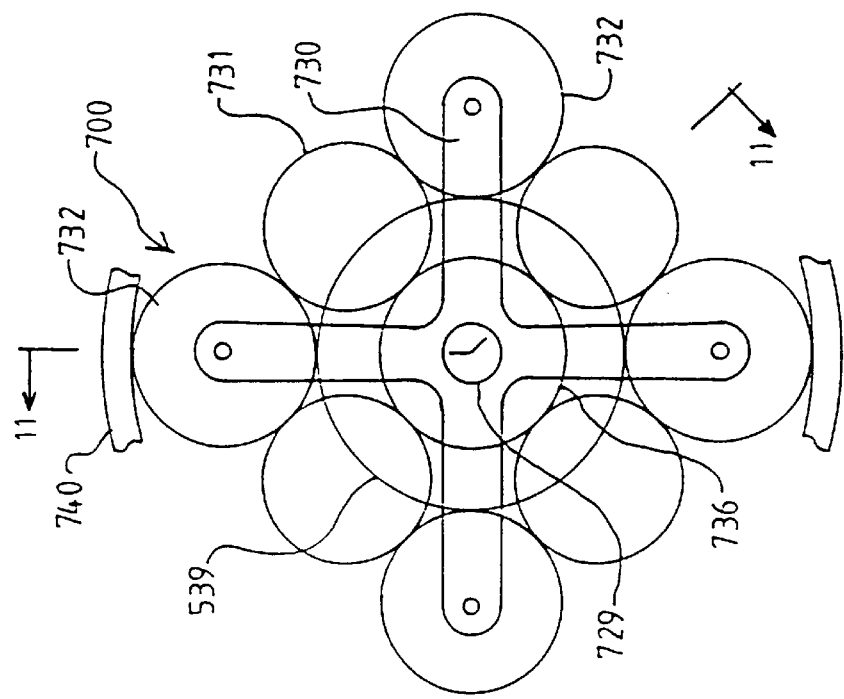
FIG. 12 is a fragmentary end view of the gear set of FIG. 11.
Figure 11:
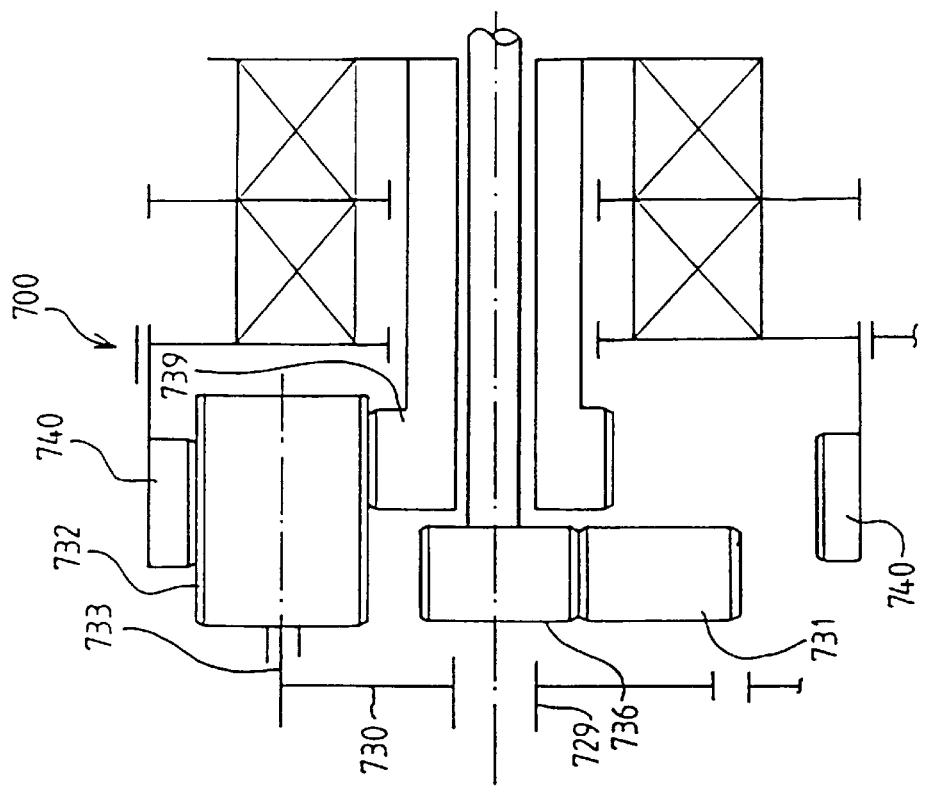
FIG. 11 is a diagrammatic illustration, similar to that of FIG. 7, of a still further gear set for use in the transmission of FIG. 6, on the line 11—11 of FIG. 12.

FIGS. 11 and 12 show a further alternative configuration of controllable four element differential gear referred to as 700 in FIGS. 11 and 12. The same reference numerals have been used in FIGS. 11 and 12 as were used in FIGS. 4–8*a* for corresponding parts but with the substitution of an initial FIG. 7 for a FIG. 5. The gear set shown in FIGS. 11 and 12 differs from the gear sets previously described and in particular from the gear set of FIGS. 4–8*a* by virtue of the first planet gears 731 not being supported on the carrier 730. Instead, the first planet gears 731 "float". That is to say, each first planet gear 731 is retained in mesh with two adjacent second planet gears 732 and with the first sun gear 736 solely by virtue of its meshing therewith, as best shown in FIG. 12.

This configuration of gear set provides still more limited ratios than the gear sets described hereinbefore.

Although the controllable four element differential gears 500–700 and associated transmission have been described hereinbefore in one particular application, they may be used in other applications and, in particular, the controllable four element differential gears 500–700 may be used in applications where the first drive member, i.e. the member to which the annulus 540, 640, 740 and the second sun gear 539, 639, 739 may alternately be connected is either a driven shaft, as in the previously described embodiment, or a driving shaft, whilst the second element 529, 629, 729 and the third element 537, 637, 737 may comprise driven shafts instead of driving shafts of the previously described embodiment.

Although particular embodiments utilising various forms of epicyclic gear have been described hereinbefore, if desired the invention may be applied to other forms of summing and reversing transmission.

If desired the drive path through any particular transmission or gear set may be reversed.

Moreover, a transmission embodying the invention may be used in any desired application, vehicular or otherwise.

Figure 13:
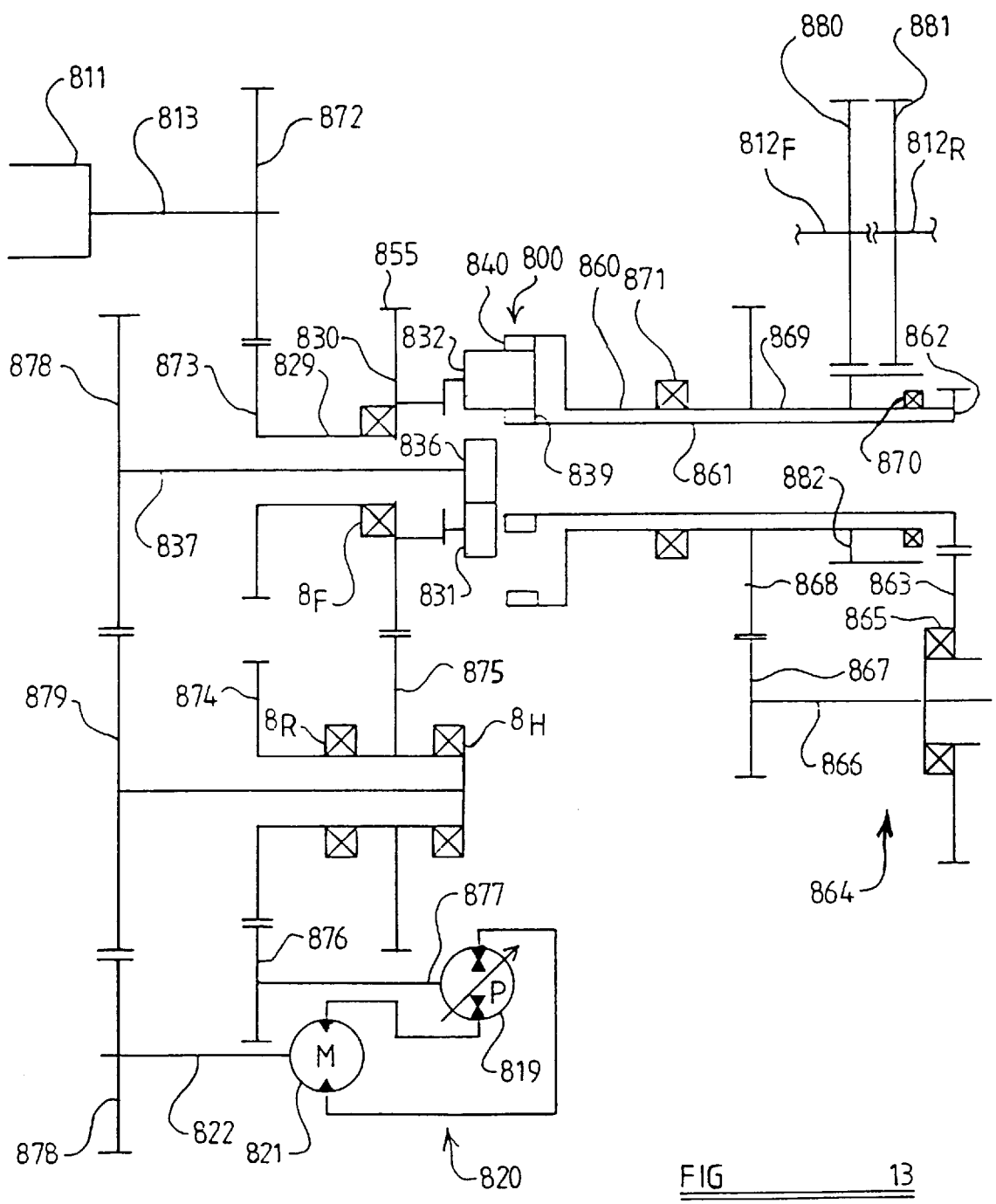
FIG. 13 is a diagrammatic illustration of another drive transmission embodying the invention.
Figure 13A:
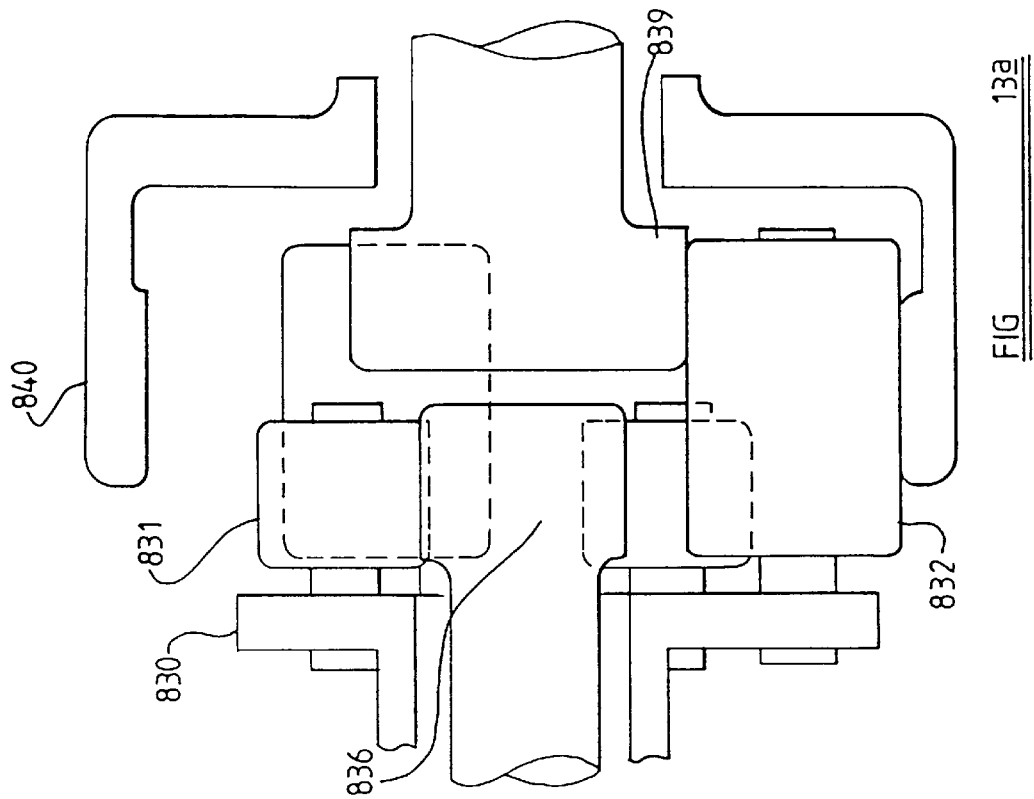
FIG. 13a is a diagrammatic illustration of an epicyclic gear set used in the transmission of FIG. 13.
Figure 13B:
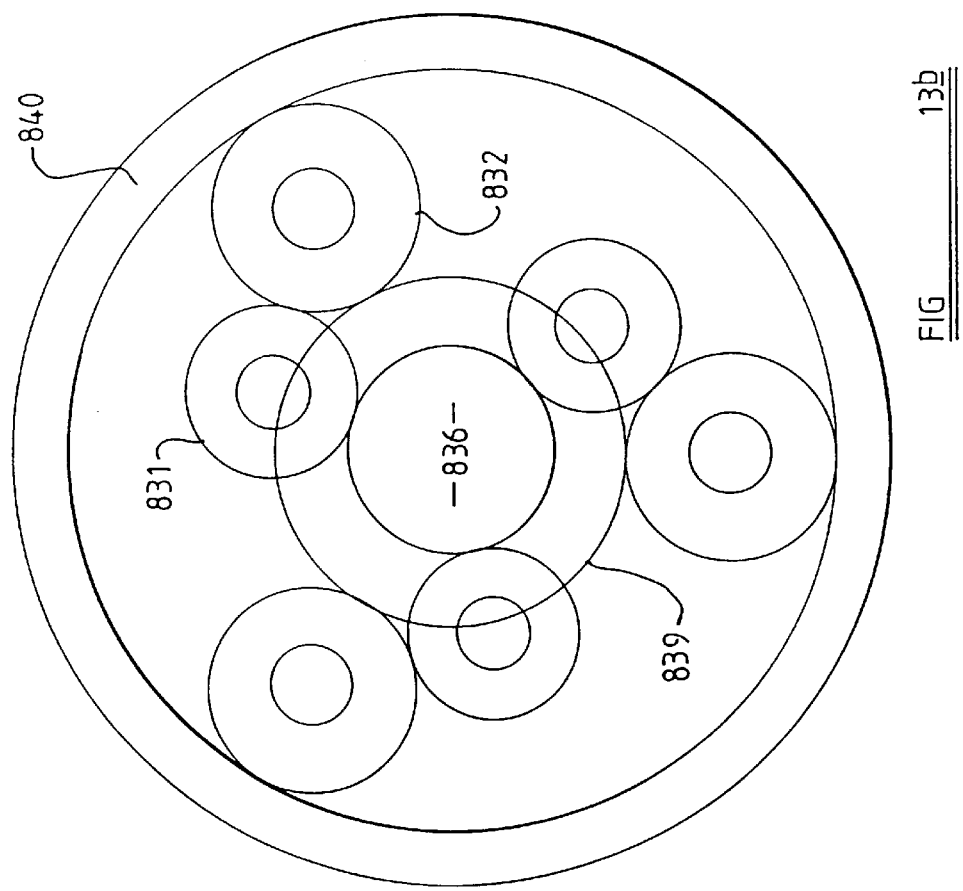
FIG. 13*b* is a fragmentary end view of the lay gear set of FIG. 13*a*.

Referring now to FIGS. 13–13b, there is shown a further transmission similar to that described with reference to FIG. 6, and hence the same reference numerals are used as have been used in FIG. 6 for corresponding parts but with an initial FIG. 8.

The transmission of FIG. 13 incorporates a four branch differential gear 800 which is similar to that described with reference to FIGS. 7–8a and comprises a planet carrier 830 which carries three first planet gears 831 and three second planet gears 832. The first planet gears, in this embodiment, are of constant diameter and mesh with a first sun gear 836 and with a portion of the second planet gears 832. A longitudinally adjacent portion of the second planet gears 832 meshes with a second sun gear 839. The second planet gears 832 are also in mesh with an annulus 840.

The carrier 830 acts as a first shaft of the controllable four branch differential gear 800, whilst the annulus 840 acts as a second shaft, the first sun gear 836 acts as a third shaft, and the second sun gear 839 acts as a fourth shaft.

The annulus 840 is connected to a hollow shaft 860 whilst the second sun gear 839 is carried by a further hollow shaft 861. The first sun gear 836 is connected to a shaft 837 whilst the carrier 830 is connected to a hollow shaft 829. The carrier 830 is provided with a peripheral gear 855.

The inner hollow shaft 861, is provided with a gear 862 which meshes with a second gear 863 of a range change gear set 864. The gear 863 is connectable by a fourth, or first output/range change, clutch 865 to a lay shaft 866 to which is fixed a first lay shaft gear 867 which meshes with a gear 868 fixed to the hollow shaft 869 which is mounted to rotate co-axially with the shaft 861. The shaft 869 is connected by gear 882 and gears 880 and 881 to forward and reverse output members 812F and 812R.

The outer tubular shaft 860 connected to the annulus 840 is connectable by a fifth or second output clutch 871 to the tubular shaft 869 whilst the inner shaft 861 is connectable by a sixth, or third output, clutch 870 to a tubular shaft 869.

The engine 811 is connected by an input member 813 to the transmission. The input member 813 is connected to an input gear 872 with meshes with a first input idler gear 873 and with a second input idler gear 874.

The second idler gear 874 meshes with a gear 876 which drives an input element 877 of a variable speed hydrostatic transmission 820 of the kind previously described.

The shaft 837 connected to the first sun gear 836 is connected to a first gear 878 which meshes with a second gear 879 which is driven by a third gear 878 connected to the output element 822 of the transmission 820. The second gear 879 is connected by a first, or hydrostatic, clutch 8H to an intermediate gear 875 which meshes with the gear 855 of the carrier 830. The carrier 830 is connectable by a second, or forward, clutch 8F to a hollow shaft connected to the first input idler 873 whilst the second input idler gear 874 is connectable by a third or reverse clutch 8R to an intermediate gear 875.

In use, assuming that the vehicle is initially stationary, so that the forward and reverse output members 812R, F are stationary, the first clutch 8H is engaged and, the second and third clutches 8F and 8R are disengaged, whilst the first output clutch provided by the range change clutch 865 is engaged, whilst the second and third output clutches 871, 870 are disengaged.

The engine 811 drives the input element 877 of the hydrostatic transmission 820 via gears 872, 874 and 876. No drive is communicated to the four branch differential directly from the engine since the clutches 8F and 8R are disengaged. The output element 822 of the hydrostatic transmission is connected by gears 878a, 879 and 878 to the first sun gear 836 and by the gears 878a, 879, clutch 8H and gears 875 and 855 to the carrier 830 and thus the carrier and the sun gear are rotated in the same direction at the same speed. Initially, since the swash plate angle is zero, no movement of the output element 822 takes place and the vehicle remains stationary. If it is desired to drive forwardly the swash plate angle is increased in a forward drive direction to cause the output element 822 to rotate in the forward direction, thus rotating the first sun gear 836 and carrier 855 in the same direction and at the same speed so that the differential 800 rotates as a "locked" unit and hence the two output shafts 860, 867 also rotate at the same speed as each other and at the same speed as the two input shafts 837, 829.

Drive is transmitted from the inner shaft 861 via gears 862 and 863 and first output clutch 865 to lay shaft 866 and via gears 867 and 868 to shaft 869 and thence via gears 882 and 880, 881 to output members 812F and 812R.

At maximum swash plate angle the gear set 800 gears are arranged to be driven at the speed of rotation of the input member 813, but in the reverse direction thereto, so that the second clutch 8F may be engaged and then the first clutch 8H allowed to become disengaged in a similar manner to previously described embodiments.

Once the second clutch 8F has been engaged the swash plate angle may be reduced and hence the speed of rotation of the sun gear 836 decreased whilst the speed of rotation of the carrier 830 is maintained at the same "engine" speed and as a result the speed of rotation of the sun gear 839 increases and this increase in speed of rotation is transmitted to the output members 812F and 812R through the first output/lay shaft clutch 865 as in purely hydrostatic drive.

Continuing faster rotation of the output members 812F and R continues as the swash plate angle is reduced to zero and then increased in the reverse direction to cause the first sun gear 836 first to become stationary, when the swash plate angle is zero, and then to rotate at increasing speed in the reverse direction.

At maximum swash plate angle in the reverse direction the annulus 840 is rotating at its slowest speed whilst the second sun gear 839 is rotating at its fastest speed. The ratio of these two speeds is R1.

The lay shaft gear ratio also substantially equals R1 and thus at this point the speed of rotation of the gear 868 and hence of the shaft 869 is substantially the same as the speed of rotation of the annulus 840 and thus the second output clutch 871 may be engaged and then the first output/range change clutch 865 can become disengaged.

As the swash plate angle is reduced to zero the sun gear speed in the reverse direction decreases, then becomes stationary and then increases again in the forward direction as the swash plate angle is increased in the positive direction, thus speeding the rotation of the annulus 840 and hence of the shaft 869 and hence of the output members 812F and R via gears 882, 880 and 881.

When the swash plate angle is at its maximum in a forward direction the annulus 840 and second sun gear 839 are rotating at the same speed and hence the third output clutch 870 can be engaged and then the second output clutch 871 becomes disengaged. As the swash plate angle is reduced first to zero and then to maximum in the reverse direction, increase in speed of rotation of the second sun gear 839 occurs. In this case drive is transmitted via the clutch 870 to shaft 869 and then via gears 882, 880 and 881 to output members 812F and R.

When it is desired to operate in the reverse direction then, with first clutch 8H engaged and second and third clutches 8F and 8R disengaged movement of the swash plate in the reverse direction causes reverse direction of rotation of the gear set 800 and hence reverse drive is transmitted to the output members 81F and R. When the swash plate angle reaches its maximum in the reverse direction then, as in the case of the first embodiment, the carrier 830 is rotating at the same speed as the input member 813 but in the same direction thereas and hence the gear 874 is also rotating at the same speed and direction as the gear 875 so that the reverse clutch 8R can be engaged and then the hydrostatic drive clutch 8H can be disengaged. Thereafter the transmission operates in an exactly similar manner, but in the reverse direction to that described hereinbefore for forward drive.

The hereinbefore described transmission therefore provides forward or reverse drive up to a hydrostatic range and three compound ranges thus providing maximum torque at zero vehicle speed as the vehicle starts to move in either forward or reverse.

Of course, if desired, the highest range in reverse may be omitted when it is not required to drive a vehicle in reverse in the speed range which would be provided by the highest speed range. This is provided simply by inhibiting engagement of third clutch 870 and preventing disengagement of clutch 871 when clutch 8R is engaged, in the control means of the transmission.

Figure 14:
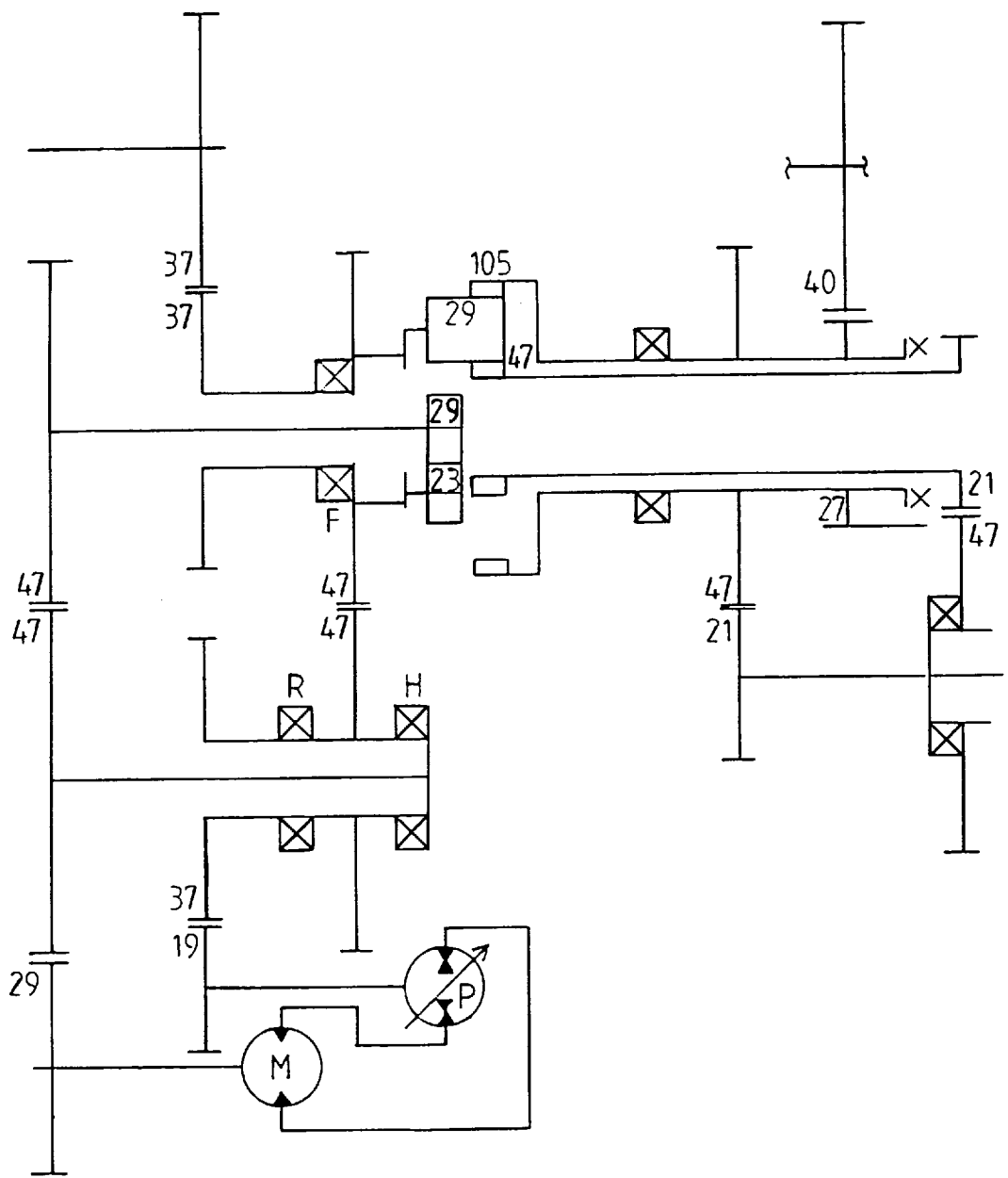
FIG. 14 is a diagrammatic illustration of the transmission of FIG. 13 showing gear ratios.

FIG. 14 shows the number of teeth provided on the various gears of the embodiment shown in FIG. 13. In this example at maximum forward swash plate angle the slowest speed of annulus 840 is 0.448 A rpm where Arpm is the speed of rotation of the input member 813, whilst the speed of rotation of the second sun gear 839 is then at its fastest, namely 2.234 A. The ratio of the two speeds is 4.99.

The lay shaft ratio is $$\frac{47}{21} \times \frac{47}{21} = 5.01$$

Because 5.01 is not equal to 4.99 synchronicity does not occur at precisely minus 100% swash angle but it is sufficiently close for practical purposes.

Set out below are the ratio ranges provided in the various ranges described hereinbefore. In the example illustrated there is no fourth reverse range and the lowest forward and reverse ranges are referred to as range 2 because in the embodiment to be described hereinafter an intermediate range is provided which is lower than range 2 and since in that embodiment ranges 2, 3 and 4 are the same as in the present embodiment, for consistency the above mentioned range number nomenclature has been adopted.

| | |
|---|---|
| Reverse range 3 ratio:- | −3.31:1 → —1.48:1 |
| Reverse range 2 | −7.42:1 → −3.31:1 |

-continued

| | |
|---|---|
| Hydrostatic | −7.42:1 → +7.42:1 |
| Forward range 2 | +7.42:1 → +3.31:1 |
| Forward range 3 | +7.42:1 → +1.48:1 |
| Forward range 4 | +7.42:1 → +0.66:1 |

Figure 15:
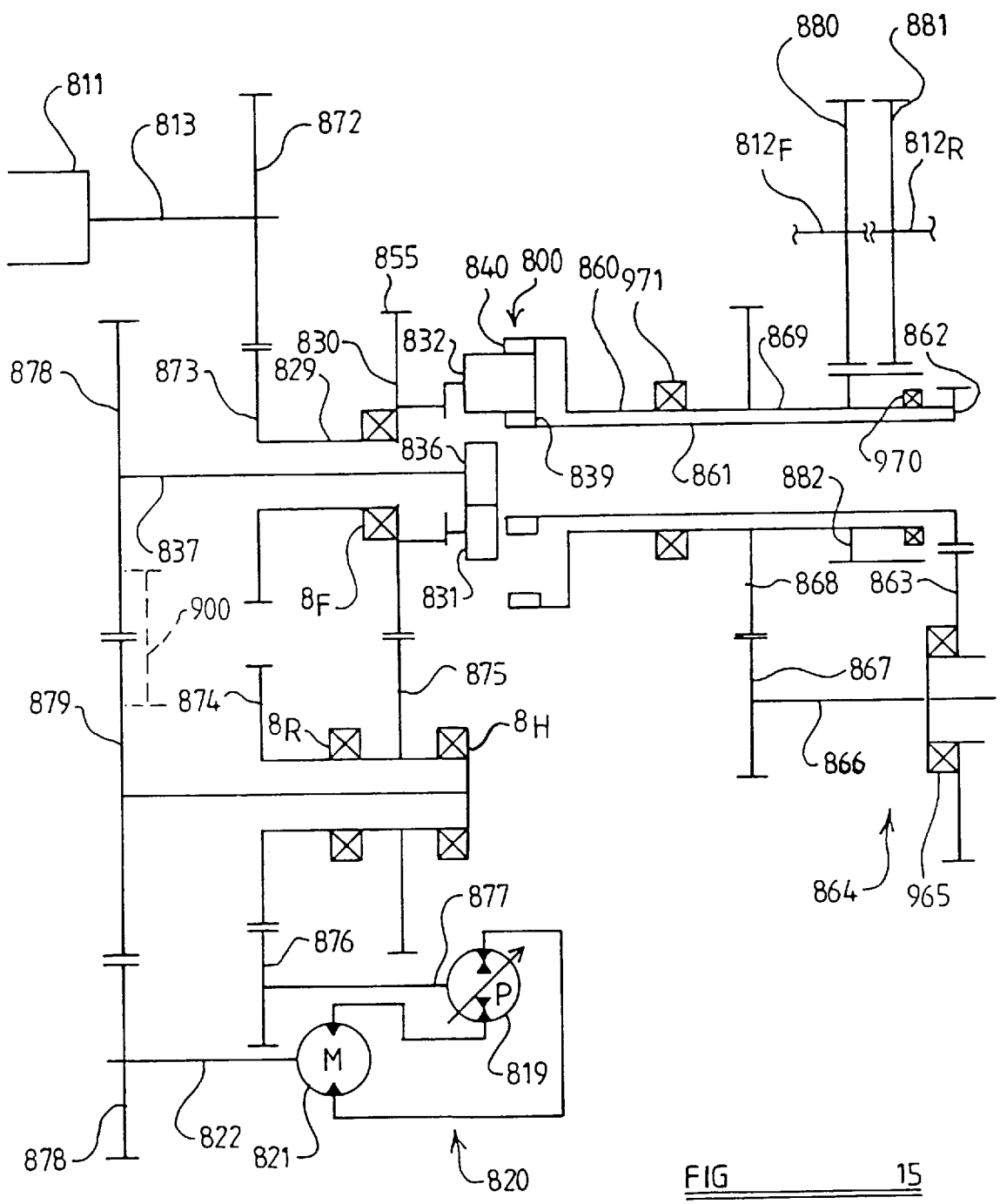
FIG. 15 is a diagrammatic illustration of another drive transmission.

Referring now to FIG. 15 there is shown a modification of the embodiment described with reference to FIGS. 13 to 14. The same reference numerals have been used in FIG. 15 as were used in FIG. 13 to refer to corresponding parts and different parts are referred to with an initial FIG. 9.

The transmission of this embodiment differs from that of FIG. 13 solely by the addition of an idler gear 900 interposed between the first gear 878 and the second gear 879 so that the gear 878 is driven from the gear 879 in the same direction as the direction of rotation of the gear 879. Consequently, in this embodiment, the first sun gear 836 rotates in the reverse direction to the carrier 830.

Consequently, in the hydrostatic range, i.e. when clutch 8H is engaged and the forward and reverse clutches 8F and 8R are disengaged the sun gear 836 and the carrier 830 counter-rotate and the annulus 840 is driven relatively slowly forwardly and the second sun gear 831 relatively quickly, the absolute speed increases from 0 as the swash plate angle is increased. The annulus is connected by a first output clutch 971 to the shaft 869 and hence to the output member 812F and R.

At maximum swash angle in the forward direction the first sun gear 836 is rotating in a "reverse" direction at the speed of rotation A of the input member 872 whilst the carrier 830 is rotating in a "forward" direction at speed A, i.e. synchronous with first input idler 873. Consequently, forward clutch 8F can be engaged and then clutch 8H becomes disengaged.

At said maximum forward swash angle, because the first sun gear 836 and carrier 830 are counter-rotating at maximum speed differential, the annulus 840 is rotating at minimum speed and the first output clutch 971 remains engaged to continue to transmit drive from the annulus 840 to the output members 812F and 812R through the shaft 869 as in the hydrostatic stage.

The swash plate angle is then reduced to zero and then increased to full negative swash plate angle, causing the first sun gear 836 to slow and then reverse its direction of rotation, whilst the carrier 830 is continued to be rotated at input speed A. At full negative swash plate angle the first sun gear 836 is also rotated in a "forward" direction at speed A so that both the carrier 830 and first sun gear 836 are rotated at the same speed A in the same direction. Hence the two output members 860, 861 of the transmission are similarly rotated at speed A. This situation is the same as that obtaining in hydrostatic range of the embodiment shown in FIG. 13. Accordingly, a second output clutch 965 which also constitutes a range change clutch can then be engaged and the first output clutch 971 disengages. Drive is then transmitted in an exactly similar manner to that in forward range 2 of the embodiment of FIG. 13 and continued operation of the transmission through ranges 3 and 4 is exactly as described in connection with the embodiment of FIG. 13.

When it is desired to operate in reverse, the swash plate angle of the pump 819 is increased in the reverse direction to cause reverse direction rotation of the annulus 840 and thus a reverse direction drive is transmitted via the clutch 971 to the output members 812F and R. When maximum reverse swash plate angle has been reached the sun gear 836 is rotating at the speed A but in the reverse direction and thus reverse clutch 8R can be engaged and shortly after clutch 8S disengaged.

Operation then continues as in the forward direction except of course that the elements of the transmission are running in reverse. Again, if desired, the fourth range may be omitted in reverse where it is not desired for the vehicle to be able to operate in reverse at that speed range.

The transmission described with reference to FIG. 15 is therefore the same as that described with reference to FIG. 13 in its function except that the hydrostatic range is shortened and a first range is interposed between the shortened hydrostatic range and the second ranges, both in forward and reverse.

A transmission as described with reference to FIGS. 13–15 may have a differential gear set 500, 800 which is as described with reference to any one of FIGS. 7–12 if desired. The differential gear sets 500, 800 of FIGS. 6–15 may be used in other applications if desired.

Figure 16:
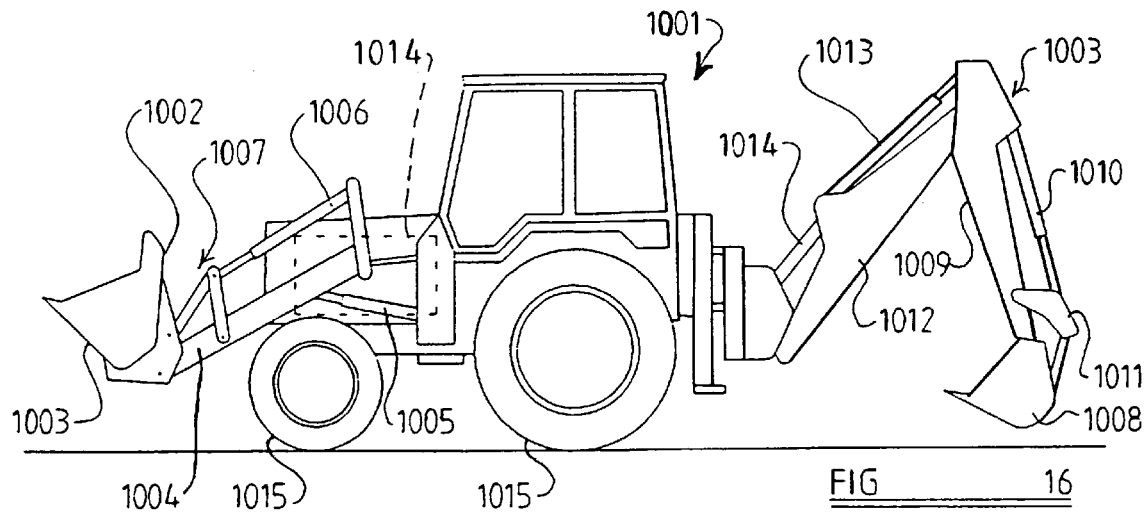
FIG. 16 is a fragmentary side view of a construction vehicle embodying the invention.
Figure 17:
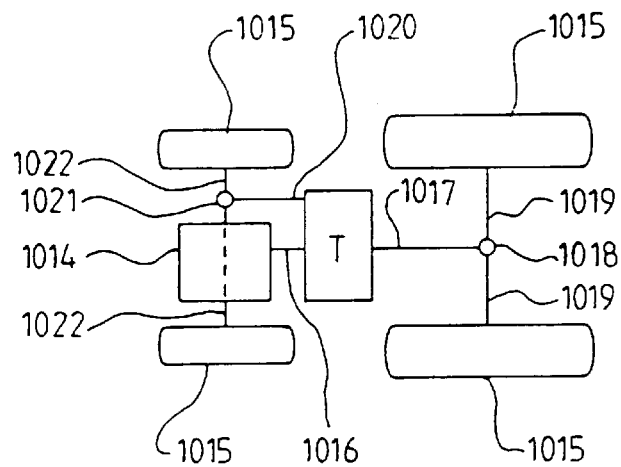
FIG. 17 is a fragmentary plan view showing the drive transmission of the vehicle of FIG. 16.

A transmission as described hereinbefore may be of any desired application but is particularly intended for use in a construction vehicle of the kind having a moving implement. One such vehicle is illustrated in FIGS. 16 and 17 where a vehicle 1001 is provided with a front end loader 1002 and a back hoe excavator 1003, both of conventional kind. The front end loader 1002 comprises a bucket 1003 pivotally mounted on a pair of spaced parallel lift arms 1004 which are pivotally mounted on the vehicle for raising and lowering movement by hydraulic rams 1005. In addition, the arms are provided with a pair of crowd rams 1006 for causing crowd movement of the bucket 1003 about its pivotal connection to the arms 1004 via a crowd linkage 1007.

The back hoe excavator 1003 comprises a bucket 1008 pivotally connected to a dipper arm 1009 and movable for crowd movement relative thereto by a crowd ram 1010 and crowd linkage 1011. The dipper arm 1009 is pivotally mounted at the upper end of a boom 1012 under the control of a dipper arm ram 1013, the boom itself being movable up and down by a raising and lowering ram 1014. The boom 1012 is also pivotal about a vertical axis and can also be slid transversely of the rear of the tractor.

The vehicle 1001 has an engine 1014 which provides motive power for the vehicle and also pressurises hydraulic fluid for operation of the front end loader and back hoe excavator. In addition the vehicle has four ground engageable wheels 1015.

The wheels 1015 are driven from the engine 1014 by a transmission T which is as described in any of the previous embodiments, the input member of the transmission T being driven from the engine 1014 via a shaft 1016 and a rear output member of the transmission being connected to a rear drive shaft 1017 which is connected via a differential 1018 and drive shafts 1019 to the rear wheels of the vehicle. A forward output member is connected via a shaft 1020 to drive the front wheels via a differential 1021 and drive shafts 1022.

If desired, only the rear wheels of the vehicle may be driven, in which case the forward drive member and associated shaft 1020, differential 1021 and drive shafts 1022 may be omitted.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

We claim:

1. An infinitely variable drive transmission comprising an input member, a summing gear set, a variable speed transmission having an input element drivable by said input member and an output element, said output element of the variable speed transmission being connectable to one element of the summing gear set, to provide a first path between the input member and the summing gear set, a first, a second, and a third clutch, said input member being connectable by one of said second clutch and said third clutch to another element of the summing gear set to provide a second path between the input member and the summing gear set, the summing gear set having a driven member drivable by at least one further element of the summing gear set and drive transmitting means, comprising said first clutch, connectable between the output element of the variable speed transmission and said other element of the summing gear set alternatively to one of said second or third clutches and further comprising, a first gear drivingly connected to said other element of the summing gear set and connectable to said input member by said second clutch for rotation in a first direction, a second gear drivingly connected to said first gear, said second gear being connectable to said input member by said third clutch for rotation of the first gear in a second direction opposite to said first direction and connectable to said output element of the variable speed transmission by said drive transmission for rotation in one of a first and second direction respectively.

2. A transmission according to claim 1 wherein the drive transmitting means causes rotation of the one and other elements in the same direction.

3. A transmission according to claim 1 wherein the drive transmitting means causes rotation of the one and other elements in opposite directions.

4. A transmission according to claim 3 wherein the drive transmitting means is a reversing gear set connectable between the output element of the variable speed transmission and one of said one and said other element of the summing gear set.

5. A transmission according to claim 1 wherein the variable speed transmission is hydrostatic transmission.

6. A transmission according to claim 1 wherein said summing gear set comprises a controllable four element differential gear set, first and third elements thereof providing said other and said one elements of the summing gear set respectively, and second and fourth elements thereof providing said further elements of the summing gear set and being alternatively connectable to the driven member.

7. A transmission according to claim 6 comprising a first output clutch to connect the second element to the drive member and a second output clutch to connect the fourth element to the drive member.

8. A transmission according to claim 7 comprising a range change gear set comprising a lay shaft, a first lay shaft gear fixed to rotate with the lay shaft, a second lay shaft gear connectable to rotate with the lay shaft by a range change clutch; the first lay shaft gear may be drivingly connected to the output member and the second lay shaft gear may be drivingly connected to the fourth element.

9. A transmission according to claim 8 wherein an idler gear is interposed between the first gear and the second gear to cause them to rotate in the same direction.

10. A transmission according to claim 6 wherein the controllable four element differential gear comprises a first stage summing gear set connected to a second stage summing gear set.

11. A transmission according to claim 10 wherein the first stage summing gear set is selected from the croup consisting of a "parallel axis epicyclic gear set", a "spur gear epicyclic gear set" and the second stage summing gear set comprises a "parallel axis epicyclic gear set", a "cross axis epicyclic gear set" or a "sun wheel compound epicyclic gear set", a "twin annulus compound parallel axis epicyclic gear set", a "spur gear epicyclic gear set".

12. A transmission according to claim 10 wherein a fourth clutch is provided for connecting the second element of the first stage summing gear set to the driven member and a fifth clutch is provided for connecting the second stage summing gear set to the driven member.

13. A transmission according to claim 12 wherein the first stage summing gear set comprises a "spur gear epicyclic gear set" and the first stage summing gear set is provided with a third spur gear, comprising a fourth element, in mesh with one gear of each pair of planet gears and thus connected to rotate with the first element of the first stage summing gear set, with the second element of the second stage summing gear set, with the second element of the second stage summing gear set being connected to rotate with the fourth element of the first stage summing gear set.

14. A transmission according to claim 6 wherein the controllable four element differential gear set comprises, a carrier, comprising a first element, a plurality of first planet gears, a plurality of second planet gears, the carrier supporting at least the second planet gears, an annulus comprising a second element, a first sun gear comprising a third element, in mesh with the first planet gears, each second planet gear being in mesh with a first planet gear and with the annulus, and a second sun gear, comprising a fourth element, in mesh with the second planet gear.

15. A transmission according to claim 14 wherein the planet carrier supports the second planet gears only, each first planet gear being retained in mesh with two adjacent second planet gears and the first sun gear by virtue of its meshing therewith.

16. A transmission according to claim 1 wherein a range change gear set is provided, there being a range change clutch to connect the summing gear set to the drive member through the range change gear set.

17. A transmission according to claim 1 wherein the drive transmission comprises a first gear to drive said one element of the summing gear set, a second gear to drive said other element of the summing gear set, a third gear, driven by said output element to drive said second gear, the first gear being driven from the second gear in a direction selected from the opposite and the same direction as the second gear.

18. A transmission according to claim 1 wherein the input member drives a first input idler gear, connectable by the second clutch to said other element, and a second input idler gear, alternatively connectable by the third clutch to an intermediate gear to drive said other element in the reverse direction to that in which it is driven by the first input idler gear.

19. A transmission according to claim 18 wherein the second input idler gear is co-axial with a shaft to which the second gear is connected and which shaft is connectable by the third clutch to said intermediate gear.

20. A transmission according to claim 18 wherein the input element of the variable speed transmission is driven from said second input idler gear.

21. A transmission according to claim 18 wherein the second input idler is co-axial with a shaft which is connectable by said third clutch to said intermediate gear.

22. A transmission according to claim 1 when provided in a vehicle with the driven member of the transmission being connectable to provide at least one of motive power for the vehicle and a power input to apparatus of the vehicle wherein the vehicle is a construction machine provided with an earth moving appliance.

23. A controllable four branch differential gear comprising, a carrier, comprising a first element, a plurality of first planet gears, a plurality of second planet gears, the carrier supporting only the second planet gears, an annulus comprising a second element, a first sun gear comprising a third element, in mesh with the first planet gears, each second planet gear being in mesh with a first planet gear and with the annulus, and a second sun gear comprising a fourth element, in mesh with the second planet gear, wherein the planet carrier supports the second planet gears only, each first planet gear being retained in mesh with two adjacent second planet gears and the first sun gear by virtue of its meshing therewith.

24. A differential according to claim 23 wherein the first and second planet gears are mounted for rotation about respective axes which lie in a common plane radial to the axis of rotation of the carrier.

25. A differential according to claim 23 wherein the first and second planet gears are mounted for rotation about axes which lie in different planes radial to the axis of rotation of the carrier.

26. A differential according to claim 23 wherein at least one of the first planet gears and the second planet gears each have meshing parts of different diameter.

27. A differential according to claim 26 wherein each first planet gear has a first meshing part in mesh with the first sun gear and a second meshing part in mesh with a second planet gear, the first and second meshing parts being of different diameter.

28. A differential according to claim 26 wherein each second planet gear has a first meshing part in mesh with the first planet gear, a second meshing part in mesh with the annulus and a third meshing part in mesh with the second sun gear.

29. A differential according to claim 28 wherein at least one of said meshing parts is of a different diameter to said at least one other meshing part.

30. An infinitely variable transmission comprising an input member, a first drive path between said input member and a summing gear set, a second drive path between said input member and said summing gear set, the first drive path including a variable speed transmission and the summing gear set having a driven member which is drivable from said input member through at least one of said first and second drive paths.

* * * * *

UNITED STATES PATENT AND TRADEMARK OFFICE
CERTIFICATE OF CORRECTION

PATENT NO. : 5,888,162
DATED      : Mach 30, 1999
INVENTOR(S) : FRANK MOELLER, ET AL.

It is certified that error appears in the above-identified patent and that said Letters Patent is hereby corrected as shown below:

On the title page, item [*] should read--

[*] Notice: This patent is subject to a terminal disclaimer. --.

Col. 27, line 6,    group

Signed and Sealed this

Eighth Day of May, 2001

Attest:

NICHOLAS P. GODICI

Attesting Officer    Acting Director of the United States Patent and Trademark Office